United States Patent
Armstrong

(10) Patent No.: US 12,117,245 B2
(45) Date of Patent: Oct. 15, 2024

(54) HOT WATER STORAGE TANK AND A DIFFUSER

(71) Applicant: MIXERGY LIMITED, Oxfordshire (GB)

(72) Inventor: Peter Armstrong, Kidlington (GB)

(73) Assignee: Mixergy Limited, Oxfordshire (GB)

( * ) Notice: Subject to any disclaimer, the term of this patent is extended or adjusted under 35 U.S.C. 154(b) by 1150 days.

(21) Appl. No.: 16/770,419

(22) PCT Filed: Dec. 8, 2018

(86) PCT No.: PCT/GB2018/053530
§ 371 (c)(1),
(2) Date: Jun. 5, 2020

(87) PCT Pub. No.: WO2019/110996
PCT Pub. Date: Jun. 13, 2019

(65) Prior Publication Data
US 2020/0393202 A1 Dec. 17, 2020

(30) Foreign Application Priority Data

Dec. 8, 2017 (GB) ...................................... 1720450

(51) Int. Cl.
*F28D 20/00* (2006.01)
*F24D 17/02* (2006.01)
(Continued)

(52) U.S. Cl.
CPC ......... *F28D 20/0039* (2013.01); *F24D 17/02* (2013.01); *F24H 1/202* (2013.01);
(Continued)

(58) Field of Classification Search
CPC ............. F28D 20/0034; F28D 20/0039; F28D 2020/0069; F28D 2020/0078;
(Continued)

(56) References Cited

U.S. PATENT DOCUMENTS

| 5,137,053 | A | 8/1992 | Kale |
| 2014/0217187 | A1 | 8/2014 | Wen et al. |
| 2016/0047571 | A1* | 2/2016 | Jones ..................... F16M 13/02 |
| | | | 248/313 |

FOREIGN PATENT DOCUMENTS

| DE | 19710803 A1 | 9/1998 |
| DE | 20303047 U1 | 11/2003 |

(Continued)

OTHER PUBLICATIONS

Klein et al., "TRNSYS 16: A Transient System Simulation program," Mathematical Reference, vol. 5, pp. 389-396; http://web.mit.edu/parmstr/Public/Documentation/05-MathematicalReference.pdf.

(Continued)

*Primary Examiner* — Atif H Chaudry
(74) *Attorney, Agent, or Firm* — Melissa Hunter-Ensor; Nathan Hsu; Greenberg Traurig, LLP

(57) ABSTRACT

The present invention relates to a hot water storage tank (202, 302, 402, 502, 602, 702), defining a primly storage volume (204, 304, 404, 504, 604, 704), with at least one heat source (212, 312, 412, 512, 612, 712) positioned in and operable to directly heat water in the upper portion (207, 307, 407, 507, 607, 707) of the primary storage volume (204, 304, 404, 04, 604, 704), and a pump or other means (237, 337, 437, 537, 637) that draws water, from the lower portion (209, 309, 409, 509, 609, 709) of the tank into a heat transfer device (216, 316, 416, 516, 616, 716), situated in said upper portion (207, 307, 407, 507, 607, 707). The heat transfer device (216, 316, 416, 516, 616, 716) is configured to enable the transfer of heat from heated water in the upper portion (207, 307, 407, 507, 607, 707) to the drawn water prior to discharge into the water in the upper portion (207, 307, 407, 507, 607, 707).

20 Claims, 16 Drawing Sheets

(51) Int. Cl.
*F24H 1/20* (2022.01)
*F28D 7/02* (2006.01)

(52) U.S. Cl.
CPC ............. *F24H 1/203* (2013.01); *F28D 7/024* (2013.01); *F24D 2200/12* (2013.01); *F24D 2220/0207* (2013.01); *F24D 2220/042* (2013.01); *F24D 2220/08* (2013.01); *F28D 2020/0069* (2013.01); *F28D 2020/0078* (2013.01)

(58) Field of Classification Search
CPC ..... F28D 2020/0082; F28D 2020/0086; F24D 2220/08; F24D 17/0031; F24D 2220/06; F24H 1/201; F24H 1/202; F24H 1/203
See application file for complete search history.

(56) References Cited

FOREIGN PATENT DOCUMENTS

| | | |
|---|---|---|
| DE | 102012003227 A1 | 8/2013 |
| GB | 2275325 A | 8/1994 |
| GB | 2483362 A | 3/2012 |
| GB | 2534878 A | 8/2016 |
| JP | 2001343157 A | 12/2001 |
| JP | 2006105528 A | 4/2006 |
| JP | 6020362 B2 | 11/2016 |
| WO | 2009069734 A1 | 6/2009 |
| WO | 2011077428 A2 | 6/2011 |
| WO | 2017021743 A1 | 2/2017 |

OTHER PUBLICATIONS

Combined Search and Examination Report issued in corresponding United Kingdom Patent Application No. GB 1720450.4, mailed Jan. 29, 2018 (9 pages).
Combined Search and Examination Report issued in corresponding United Kingdom Patent Application No. GB 1819871.3, mailed Jun. 3, 2019 (7 pages).
International Search Report and Written Opinion in corresponding PCT Patent Application No. PCT/GB2018/053530, mailed May 10, 2019 (20 pages).
Search Report issued in corresponding United Kingdom Patent Application No. GB 1720450.4, mailed Jul. 16, 2018 (4 pages).
Kleinbach et al., "Performance study of one-dimensional models for stratified thermal storage tanks," Solar Energy, Feb. 1993, vol. 50, Issue 2, pp. 155-166.
Zurigat et al., "A Comparison Study of One-Dimensional Models for Stratified Thermal Storage Tanks," Transactions of the ASME, Journal of Solar Energy Engineering, Aug. 1, 1989, vol. 111, Issue 3, pp. 204-210.

\* cited by examiner

HOT WATER STORAGE TANK AND A DIFFUSER

This application is the U.S. national phase application, pursuant to 35 U.S.C. § 371, of PCT International Application Ser. No.: PCT/GB2018/053530, filed Dec. 5, 2018, which claims the benefit of and priority to Great Britain Application No. 1720450.4, filed Dec. 8, 2017. The entire contents of which are incorporated herein by reference.

The present invention relates to a hot water storage tank and components for use therein, in particular to heating water in a hot water storage tank.

INTRODUCTION

Central heating systems include a central heat source such as a gas or oil-fired boiler, solar collector or heat pump, which supplies hot water to both radiators for heating, and a hot water storage tank for washing. The hot water is directly fed to the radiators, and indirectly fed to the hot water storage tank via a heat exchanger positioned inside the tank. The tank is supplied with cold water from an external water supply, typically a mains water supply. When the hot water from the central heat source passes through the heat exchanger, it heats up the surrounding cold water, until eventually the water in the storage tank reaches a suitable temperature. This type of system is referred to as an indirect heating system, as the hot water from the central heating source indirectly heats the cold water in the storage tank via the heat exchanger, rather than the being directly heated by the central heating source as is the case with the radiators. Such an indirect system is advantageous as it avoids the water in the hot water storage tank becoming contaminated by residue from the radiators, which would make the water unusable for washing.

An efficient method of storing heat in a hot water storage tank is to allow a thermocline to develop in a vertical water column, which is generally achieved by minimising mixing of the vertical water column as the water is heated. Hot water is less dense than cold water and therefore if left in a tank the two will separate. Hot water will rise to the top of the tank and the cold water will sink to the bottom of the tank. A thermocline refers to the layer of water where the two temperatures meet. This may also be known as thermal stratification. There is naturally some mixing of hot and cold water at the thermocline, the greater this mixing the thicker the thermocline. It is desirable to create and maintain the thinnest possible thermocline to provide the maximum volume of water at a useable temperature and keep this thermocline steady by inducing as little mixing of the water in the tank as possible.

The heat exchanger disposed inside an indirectly heated hot water tank may be in the form of a helical coil. In known systems, it is desirable to position the heat exchanger as close to the bottom of the tank as possible to ensure that the highest possible heat transfer is achieved from the heat exchanger into the cold, stratified water present at the base of the tank. Convection currents are created as the water is heated by the coil situated in the lower portion of the tank resulting in mixing of the volume of water in the tank and preventing or harming stratification.

Hot water storage tanks need to be sterilised periodically, which can be achieved by heating the water stored in the tank to a suitable sterilisation temperature. However, a heat exchanger alone typically cannot transfer heat sufficiently to the lower regions of the tank and therefore such systems may fail to attain a required sterilisation temperature throughout the stored volume of water, so it is difficult to ensure that a tank is fully sterilised.

A possible solution to this problem is to install an auxiliary heater, such as an immersion heating element, at the base of the tank to 'boost' the heating of the water to the required sterilisation temperature. However, it has been found that even when an auxiliary heater is positioned close to the base of a tank the entire volume of the tank generally fails to attain a sufficient sterilising temperature. This is because the time lag to sterilisation due to the clearances between the bottom of the heater and the base of the tank can be in the order of hours after the majority of the rest of the water has attained a sufficient sterilisation temperature.

A further solution is to have pumps to circulate water as it is heated ensuring a uniform temperature in the tank. However, the action of the pump causes mixing in the hot water storage tank and prevents the establishment of a tightly defined a thermocline and well defined stratification between the hot and the cold portions of the water within the tank being established. It is, therefore, desirable to prevent mixing of hot and cold water as much as possible and to introduce the water into the tank in a manner which reduces and possibly eliminates the undesired mixing and, thereby, helps maintain as small a thermocline as possible.

Another problem with conventional hot water systems is that the size of a hot water storage tank specified for most domestic dwellings is typically determined by the number of rooms in the building so that the maximum possible occupancy is accommodated. As a consequence, where there is a single occupant in a multi-bedroom dwelling, the tank installed may often be oversized relative to the requirements, resulting in unnecessary heating costs as the entire tank is heated during a heating cycle. This often occurs a long time prior to usage resulting in lost energy over time. The heating schedule will also be fixed, mandating a substantial margin in the quantity of water heated to ensure that sufficient water is at the useable temperature when required. Differing draw events require different volumes and temperatures of water, and thus different quantities of energy; for example, a bath requires a greater volume of water of the same temperature, or a similar volume of hotter water than a shower.

FIG. 1 identifies the key components of the known hot water system of WO2017/021743 which attempts to address the above problems. The system 100 includes a hot water storage tank 102, and a helical coil shaped heat exchanger 112 that is positioned in the base 104 of the tank 102 for heating cold water entering the tank via inlet 18. An auxiliary heater 116 is disposed inside the tank 102 and is fluidly connected to water in the base 104 of the tank 102 such that cold water from the base 104 of the tank 102 is pumped via pump 136 to a cover 126 in which the heater 116 is positioned, and water inside the cover 126 is then heated by the heater 116. The heated water discharges from the cover 126 and heats the surrounding water. By heating cold water drawn from the base of the tank, energy going into the heater produces almost instantly available heated water while avoiding the waste of energy through stirring and/or natural convection of heat from colder water below. Thus, the amount of heated water available for instantaneous use can be optimised, and in doing so the heat losses associated with tanks that may be oversized for the number of occupants in a building may be reduced. As water drawn from beneath the heater is heated by the heater, it displaces a thermocline in the stored heated water in the tank below it downwards. Thus, when incorporated into a hot water tank, particularly a tank having a heat exchanger installed in the base of the tank, the invention may have the effect of pushing the thermocline all the way to the base of the tank, thereby effectively ensuring that full sterilisation of the tank can be reliably and quickly achieved during steady state operation without the need for an auxiliary heater to be provided in the base of the tank.

Whilst the system of WO2017/021743 offers significant advantages over conventional hot water systems, further improvements would be desirable.

Another problem associated with known hot water heating systems is knowing when to buy energy to heat the water tank based on the typical usage of the tank and the variable energy purchase price.

STATEMENT OF INVENTION

Thus, according to a first aspect of the present invention there is provided a hot water storage tank defining a primary storage volume. At least one heat source may be positioned in and operable to directly heat water in an upper portion of the primary storage volume. A hot water outlet may be positioned in the upper portion. A pump or other means may be operable to draw water, from a lower portion of the tank into a heat transfer device. The heat transfer device may be situated in said upper portion of the hot water storage tank. The heat transfer device may further be configured to enable the transfer of heat from heated water in the upper portion to the drawn water so that the heat present in the water in the upper portion of the tank is used to increase the temperature of the drawn water before it is released into the tank.

The hot water storage tank may further comprise a temperature sensor for sensing the temperature of water within the upper portion or along the entire length of the tank. A controller may be connected to the temperature sensor and the pump or other means for transferring cooler water from the base or lower portion of the tank. The controller may be operable to cause the pump to operate only to pump water into the heat transfer device when water in the upper portion is above a pre-determined threshold temperature.

The hot water storage tank may further comprise a heat transfer device that includes a heat exchanger configured to enable the transfer of heat from heated water in the upper portion to the drawn water.

The hot water storage tank may further comprise a heat exchanger that is a coiled heat exchanger.

The hot water storage tank may further comprise a heat transfer device which includes a diffuser. The diffuser may include a mixer portion for causing mixing of drawn water with heated water in the upper portion to enable the transfer of heat from heated water in the upper portion to the drawn water.

The hot water storage tank may further comprise a diffuser that comprises a first circular plate having an upper surface and a plurality of through apertures extending through a thickness of the circular plate through which drawn water can discharge into the heated water of the upper portion.

The hot water storage tank may further comprise a coiled heat exchanger having an inlet for receiving drawn water and an outlet for discharging drawn water and an upper surface. The outlet may be positioned relative to the diffuser, such that drawn water discharges onto the upper surface of the diffuser.

The hot water storage tank may further comprise, the diffuser which may further comprise a second circular plate. This circular plate may be vertically spaced apart from and may be fixed to the upper surface of the first circular plate. The second circular plate may have a radius R2 greater than the first circular plate. A plurality of through apertures may enable heated water from the upper portion to mix with the cold drawn water before the drawn water is discharged from the second circular plate.

The hot water storage tank may further comprise the circular plate defining a perimeter from which may extend an upstanding wall, the upstanding wall constraining the drawn water such that it exits the diffuser through the plurality of apertures.

The hot water storage tank may further comprise, the upstanding wall including a deflector which deflects the drawn water such that it is directed towards the upstand wall and follows a tangential path T around the perimeter of the diffuser.

The hot water storage tank may further comprise a plurality of through apertures that may be arranged at a fixed radius around a centre point of the circular plate. The apertures may be remote from the perimeter.

The hot water storage tank may further comprise the diffuser comprising a partially enclosed drawn water inlet zone which may be adjacent an open discharge zone. The drawn water inlet zone may have a drawn water inlet aperture, to allow drawn cold water to enter the drawn water inlet zone. The drawn water inlet zone may further have a cover containing a plurality of through apertures enabling heated water from the upper portion to enter the drawn water inlet zone and mix with the cold drawn water before the drawn water is discharged into the discharge zone.

The hot water storage tank may further comprise the diffuser having a dividing wall separating the drawn water inlet zone from the discharge zone. The dividing wall may include a plurality of apertures enabling the flow of mixed water from the drawn water inlet zone into the discharge zone.

The hot water storage tank may further comprise the diffuser which may taper outwards from the drawn water inlet zone towards the discharge zone.

The hot water storage tank may further comprise the diffuser comprising a perimeter and an upstanding wall. The upstanding wall may extend partially around the perimeter, to define an open end in the discharge zone. The upstanding wall preventing the discharge of drawn water into the heated water of the upper portion until the drawn water reaches the open end.

The hot water storage tank may further comprise at least one heat source comprising a coiled heat exchanger, having a water inlet operable to receive hot water from an external heat source, and a water outlet operable to return water to the external heat source.

The hot water storage tank may further comprise the water inlet positioned, in use, above the water outlet.

The hot water storage tank may further comprise the at least one heat source including an electrical heating element.

The hot water storage tank wherein the heating element may be positioned below the diffuser.

The heat exchange device may be a canister. The heating element may be at least partially housed in the canister.

The hot water storage tank may further comprise the at least one heat source being one or more of a gas-fired boiler, a heat pump, biomass, or solar thermal.

The hot water storage tank may further comprise a feed pipe fluidly connected between the heat transfer device and a lower portion of the hot water storage tank to enable water to be drawn from the lower portion to the heat exchange device. The feed pipe being positioned inside and extending below at least a half-way point H/2 of the height H of the hot water tank.

The hot water storage tank may further comprise an expansion baffle.

According to a second aspect of the present invention a diffuser for a hot water storage tank may comprise a drawn water inlet zone and a discharge zone adjacent the inlet zone. Said inlet zone may have a lower plate. Said inlet zone may have a cover spaced therefrom such as to define therebetween said water inlet zone. Said inlet zone may have an inlet aperture to allow drawn cold water to enter the inlet zone. Said inlet zone may further comprise a plurality of through apertures for enabling heated water from the upper portion of the tank to enter the drawn water inlet zone and mix with water from the inlet aperture before the drawn water is discharged into the discharge zone.

The diffuser may further comprise a divider wall between said inlet zone and said outlet zone. Wherein said divider wall may include a plurality of apertures therethrough enabling the flow of water from the inlet zone into the discharge zone.

The diffuser wherein said lower plate may extend into said discharge zone.

The diffuser wherein said cover may extend over the entirety of said inlet zone and may terminate at said divider wall.

The diffuser may further comprise side walls extending upwardly from said lower plate thereby to define between them a mixing zone.

The diffuser may include an open end and may taper outwardly from said inlet zone to said open end.

The diffuser may extend through said lower plate.

The apertures of the diffuser may extend through said cover.

The diffuser may be sized so as to retain the water in the inlet zone for a sufficient time to enable mixing with the surrounding water drawn through the through apertures.

The diffuser may be positioned in an upper portion of a hot water tank.

The diffuser may comprise a single sheet of metal.

it will be appreciated that by providing the at least one heat source in an upper portion of the tank, cold water drawn into the heat transfer device is surrounded by the hotter water of the upper portion of the tank, and therefore the drawn colder water is pre-heated by the hot water already in the upper portion of the tank and the temperature of the hotter water in the top of the tank reduced before the drawn water discharges into the hotter water. As there is a reduced difference in temperature between the drawn water being discharged and the hotter water in the upper portion of the tank the densities are closer to each other and the drawn water sinks less. This has the effect of reducing mixing between the colder drawn water and the hotter water in the upper portion of the tank so that a steady thermocline is produced and develops downwards in the tank.

By providing a diffuser situated at the top of the tank the colder water drawn from the bottom of the tank is allowed to mix with the hotter water, raising the temperature of the drawn colder water before it discharges into the hotter water. As there is a reduced difference in temperature between the drawn water being discharged and the hotter water in the upper portion of the tank the densities are closer and the drawn water does not sink. The diffuser also reduces the velocity of the flow of the drawn water and discharges drawn water in a horizontal direction to reduce disturbance of the vertical thermal stratification in the tank. These effects both have the benefit of reducing mixing between the colder drawn water and the hotter water in the upper portion of the tank so that a steady, thin thermocline is produced and maintained and said thermocline develops downwards in the tank.

By modelling a historical energy draw cycle, it is possible to determine and select a heating schedule which minimises the energy cost whilst ensuring useful hot water is always available.

BRIEF DESCRIPTION OF THE FIGURES

The invention will now be described by way of example only with reference to the accompanying drawings, in which.

DETAILED DESCRIPTION

A Hot Water Storage Tank

Figure 1:
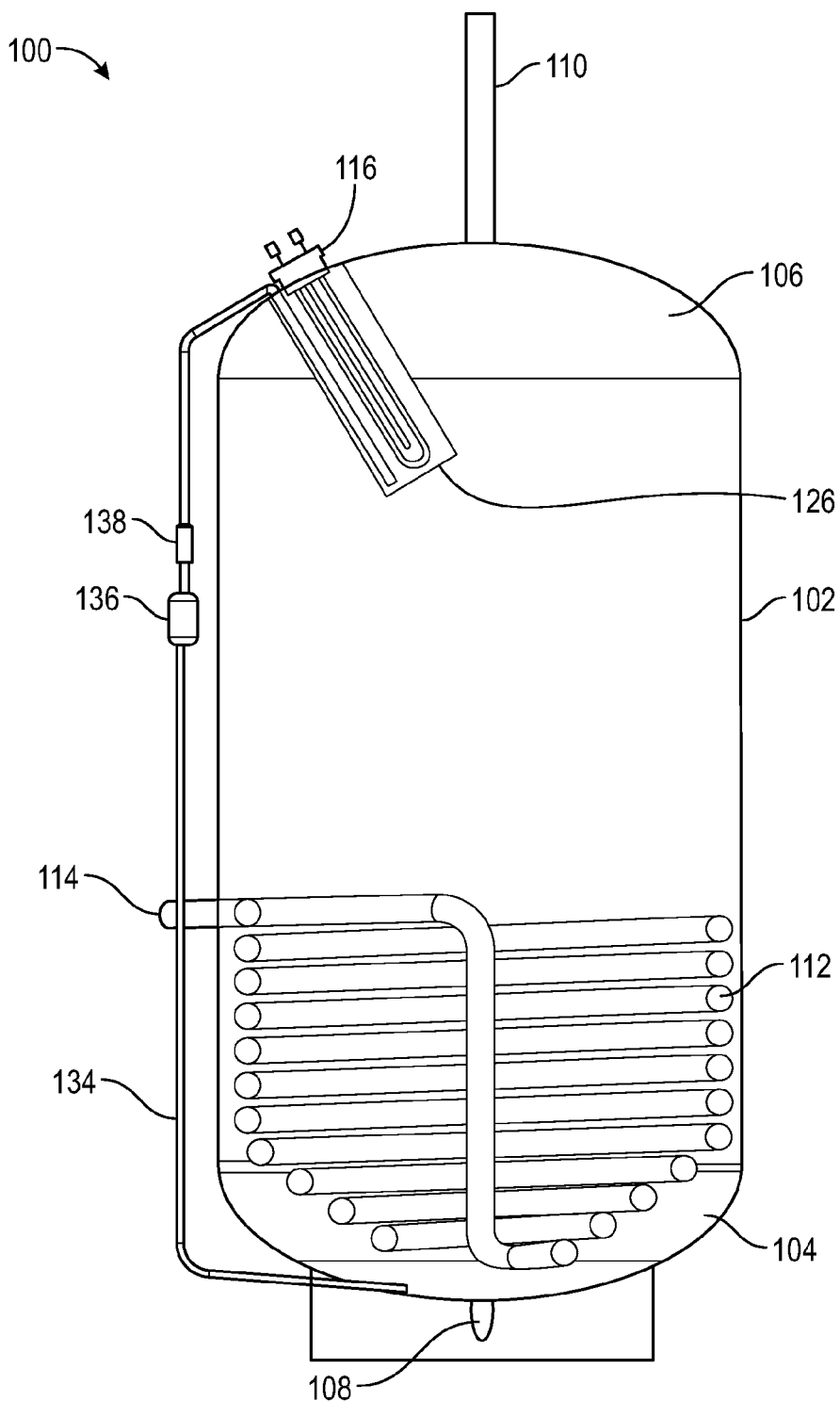
FIG. 1 is a front view showing a prior art storage tank.
Figure 2:
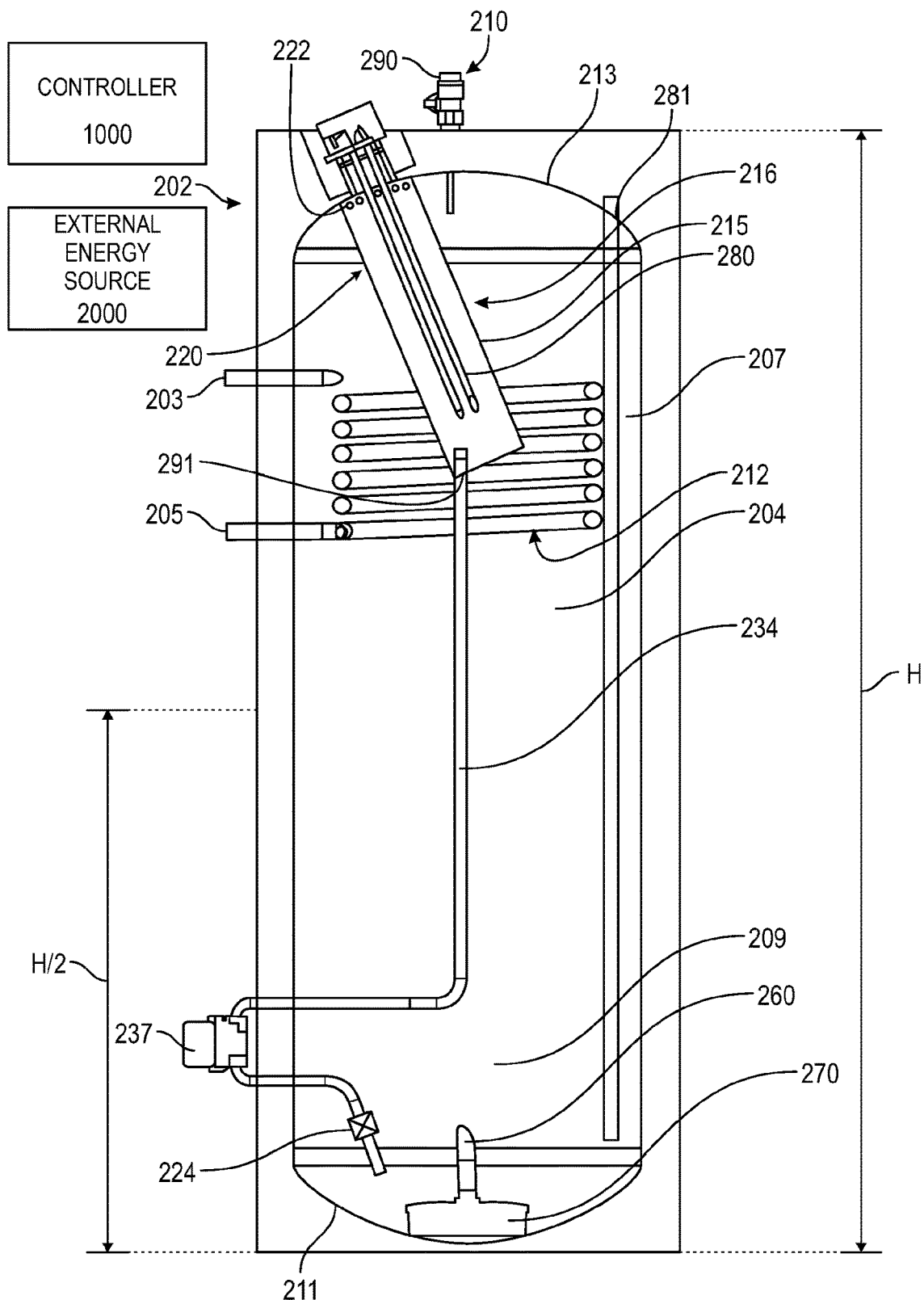
FIG. 2 is a front perspective view of a hot water storage tank according to one aspect of the present invention.
Figure 3:
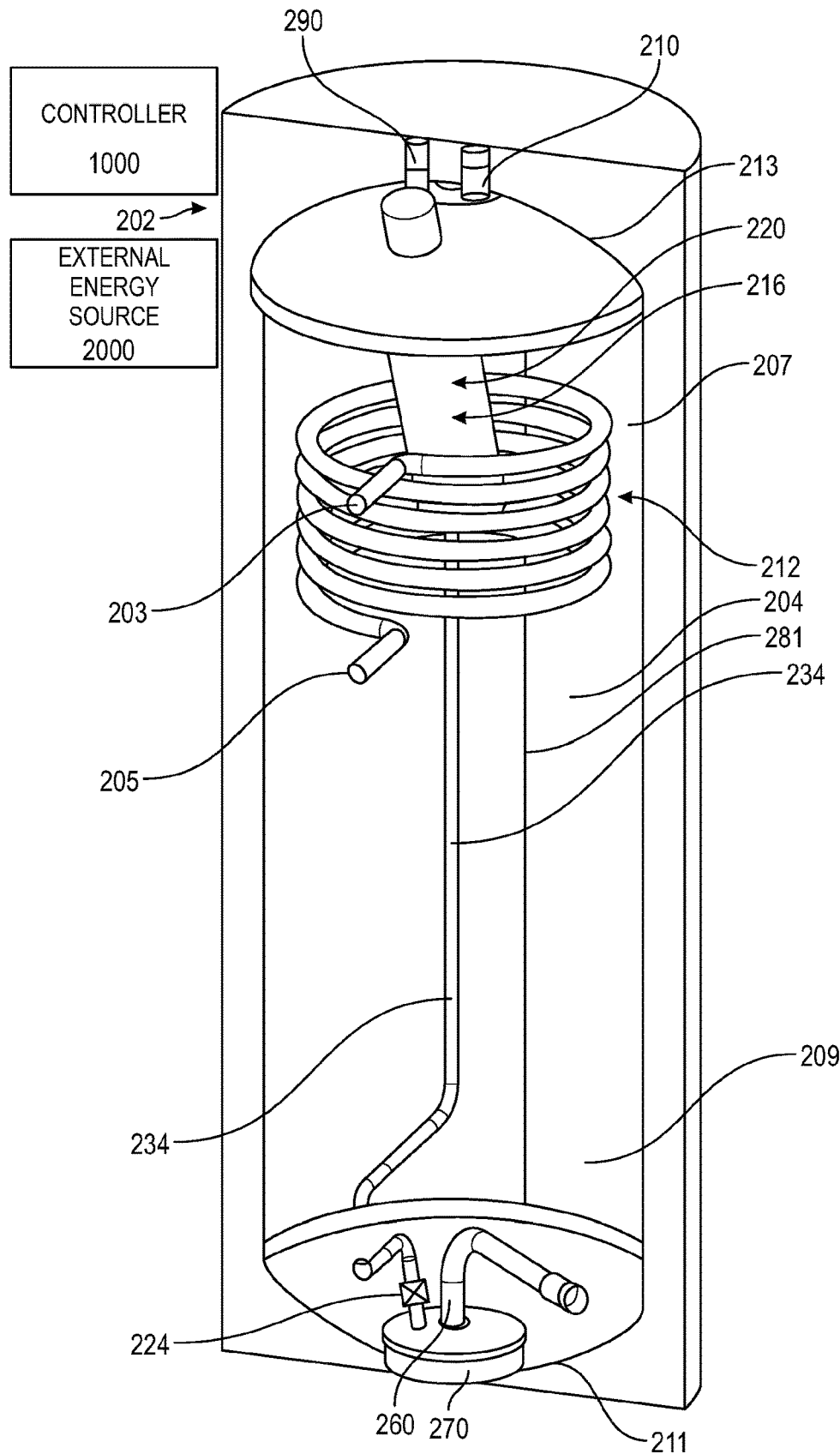
FIG. 3 is a front perspective cut-away sectional view of the hot water storage tank of FIG. 2.

In FIGS. 2 and 3, a possible embodiment of a hot water storage tank 202 is generally cylindrical with a dome-shaped base 211 and a dome-shaped top 213. In other embodiments, the storage tank need not be cylindrical and may not have domed ends. I may be tapered for example. In an embodiment without dome shaped ends, top 213 and base 211 will be understood to refer to top 213 and base 211 portions situated at each respective end.

The storage tank 202 defines an internal primary storage volume 204 which comprises an upper portion 207 and a lower portion 209 immediately below the upper portion 207. The primary storage volume 204 is the volume which stores the heated water for later use.

A main cold inlet 260 is arranged in the tank base 211 for filling and/or replenishing the tank 202 with water, typically from a mains water supply, and a main hot outlet 210 arranged in dome-shaped top 213 through which heated water may be drawn from the primary storage volume 207 for use. A diffuser 270 is fluidly connected to the main cold inlet to diffuse the water before it enters the tank 202 and therefore minimising mixing.

At least one heat source 212 is disposed in the upper portion 207 of the tank 202 such that it is operable to directly heat the water in the upper portion 207 of the tank 202. In a preferred embodiment the at least one heat source 212 includes a primary helical coiled heat exchanger 212. The heat exchanger 212 has a water inlet 203 for receiving water from an external energy source such as a gas or oil-fired boiler, a bio-mass boiler, a heat pump, solar mass, or any other external energy source 2000 and a water outlet 205 for returning water to the external energy source 2000. It can be seen that the water inlet 203 is above the water outlet 205 which is advantageous as it ensures the water in the storage tanks is heated at a higher position and a difference in temperature is maintained between the coiled heat exchanger and the water in the tank along the full length of the coiled heat exchanger, thereby improving efficiency. Hotter water rests above colder water in the tank 212. By the input 203 of the heat exchanger 212 being above the output 205 the hotter water higher in the tank 212 is heated by the hottest water in the heat exchanger 212 and it is not possible for water already cooled by the cooler water lower in the tank to take heat from the hotter water higher in the tank 212. In an alternative embodiment the at least one heat source 212 can be an electrical immersion heater 280.

The heat transfer device 216 is disposed in the upper portion 207. In a preferred embodiment the heat transfer device is disposed in the dome-shaped top 213 of the tank 202. In a favourable embodiment the heat transfer device comprises a heater assembly 216. The heater assembly 216 may include a canister 215, which may act as a diffuser 220 and an electrical heating element 280. The heater assembly 216 is mounted in a heater or immersion port provided in the top 213 of the tank 202. The heater assembly 216 can be screwed into the port which is provided with a threaded boss. The heating element 280 typically has a power output of 3 KW. The canister 215 includes apertures 222 around its upper rim to allow water to be discharged.

A fluid connection pipe 234 which is a feed pipe 234 extends between the tank base 211 and an aperture 291 in the canister 215, the fluid connection pipe 234 being arranged to draw water into the canister 215 from the lower portion 209 of the tank 202. The fluid connection pipe 234 is positioned inside the tank storage volume 204 from at least the half-way point H/2 of the height H of the hot water storage tank 202 to minimise heat losses and maximise heat transfer from the heated water in the tank storage volume 204 to the drawn water prior to said drawn water entering the heat transfer device 216. It will be understood that it is beneficial for as much of the fluid connection pipe 234 to be positioned inside the tank as possible. In an alternative embodiment all of the fluid connection pipe may be inside the water tank. The fluid connection pipe 234 includes a pump 237 or another means for causing the transfer of water 237, which is arranged to pump cold water from the base 211 or lower portion 209 of the tank 202 to the canister 215 when water in the upper portion 207 of the tank is above a pre-determined threshold temperature, typically between 50 and 65° C.

A non-return valve 224 is also provided to prevent cold water at the base 211 of the tank from being drawn up the fluid connection pipe 234 when hot water is being drawn from the tank via outlet 210. The non-return valve is configured to open at a threshold pressure. The requirement for a non-return valve depends on the pressure drop in the tank when the hot water is drawn from the tank.

The tank 202 also includes a temperature and pressure valve 290 which is configured to open at threshold values. Typically, the valve 290 will open if the temperature of the water in the tank exceeds 90° C. or the pressure in the tank exceeds 6 bar.

A state of charge sensor 281 is also provided on the wall of the tank to measure water temperature vertically through the tank by taking the temperature at a plurality of different heights in the tank, said state of charge sensor is connected to and enables the controller 1000 to modulate the speed of the pump 237 so that a steady thermocline is produced as water is discharged from the canister 215. In an alternative embodiment the state of charge sensor 281 is a temperature sensor situated within the upper portion.

The hot water storage tank of FIGS. 2 and 3 operates as follows:

Cold water enters the tank 202 through cold water inlet 260 via diffuser 270. The diffuser 270 minimises mixing of inlet water with water already in the tank and therefore minimises disturbing a thermocline that has been, or is being, established in the tank.

Cold water is drawn from the base 211 or lower portion 209 of the tank via the fluid connection pipe 234 and into the heat exchange device 216; in this embodiment the bottom of the canister 215. The primary function of the heat transfer device 216 is to transfer heat energy from the heated water in the top of the tank to colder drawn water from the base 213 or lower portion 209 of the hot water storage tank 202. By raising the temperature of the drawn water and reducing the temperature of the heated water the difference in temperature of the drawn water to the heated water in the tank is reduced. Therefore, on discharge of the drawn water from the heat exchange device 216 thermal stratification of the water in the tank 202 and a thin thermocline is maintained. Were cold water to be introduced directly without the heat transfer device the high temperature difference would cause the drawn water of a colder temperature to sink back to the level in the tank associated with said colder temperature. This would result in mixing, destratification and a broadening of the thermocline.

The water in the canister 215 is heated by the heating element 280, with the pump speed modulated such that when water is discharged from the canister via the apertures around its upper rim, the water will have been sufficiently heated to prevent mixing with the hot water in the upper portion of the tank, and therefore a steady thermocline is produced.

In an alternative embodiment to the described above in relation to FIGS. 2 and 3, the heating element 280 may be partially housed in the canister 215. In further alternative embodiments the heating element 280 need not be included in the canister 215, or can be included, but not used to heat up cold water drawn from the base of the tank 202. In this alternative embodiment, the primary helical coiled heat exchanger 212 is used to heat the water in the upper portion 207 until it reaches the pre-determined threshold temperature. Only once this temperature is detected by the state of charge sensor 281, the controller 1000 causes the pump 237 to draw cold water from the base of the tank 211 into the canister. Here the water is heated by virtue of the canister 215 being positioned close to and inside the coiled heat exchanger 212 which results in the canister 215 being enveloped by water heated by the primary coil heat exchanger 212 in the upper portion of the tank, such that heat is transferred from the heated water in the upper portion 207 of the tank to the drawn water. In the same way as described above in relation to the embodiment where the heating element 280 is used to heat the water before it is discharged from the canister, the water inside the canister 215 will have been sufficiently heated to prevent mixing with the hot water in the upper portion of the tank, and therefore a steady thermocline is produced, however in this embodiment the electrical heating element has not been used. This is advantageous, as being able to switch between alternative heating sources, which attract different energy prices at different times, enables selective use of those energy sources to minimise the cost of purchasing sufficient quantities of energy, and at sufficient times, to ensure the water is maintained above a useful temperature throughout a typical usage or draw cycle as will be described below. It will be understood that the useful temperature is the temperature required for washing, typically 43° C.

Figure 4:
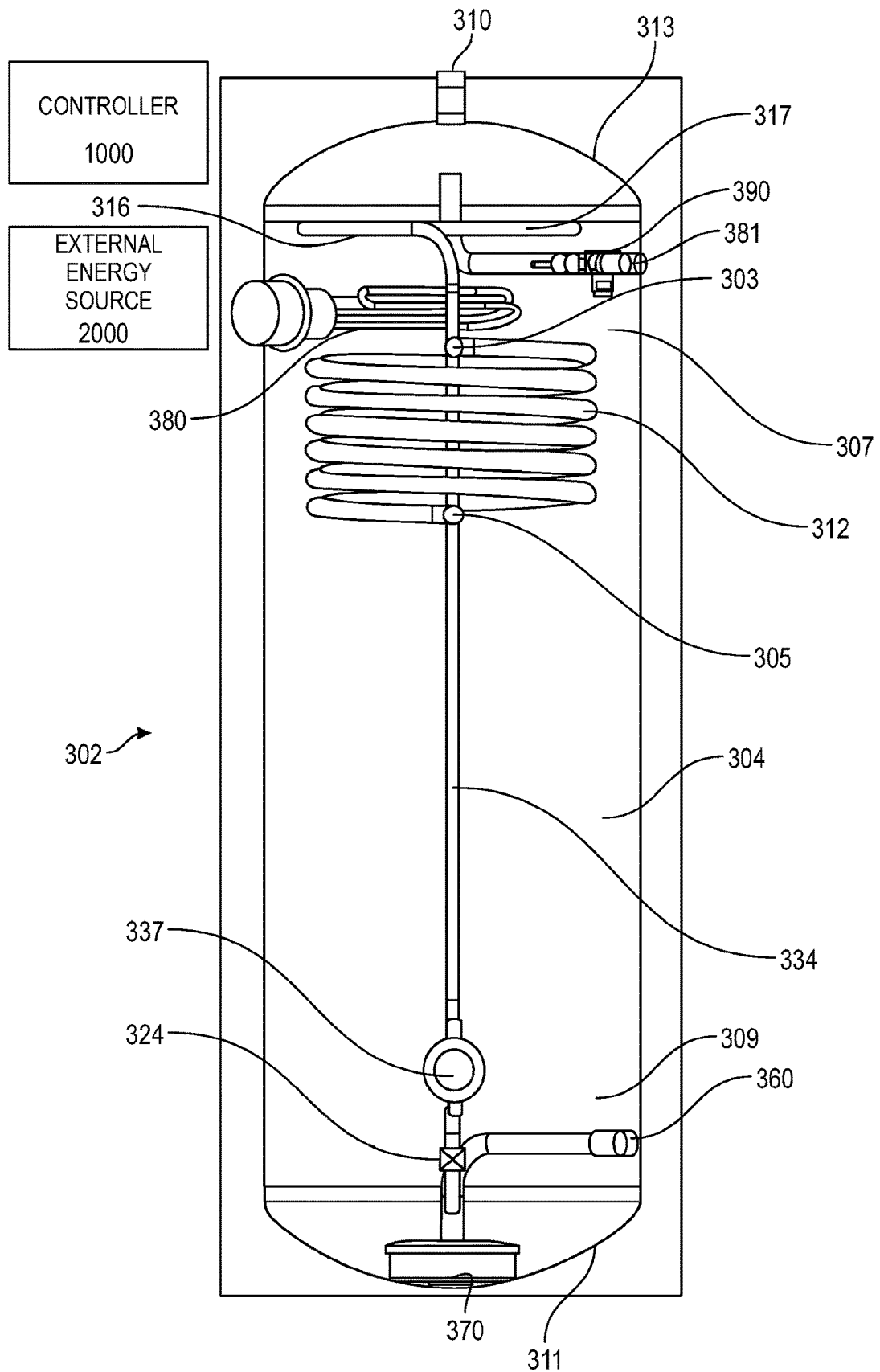
FIG. 4 is a front perspective view of a hot water storage tank according to another aspect of the present invention.
Figure 5:
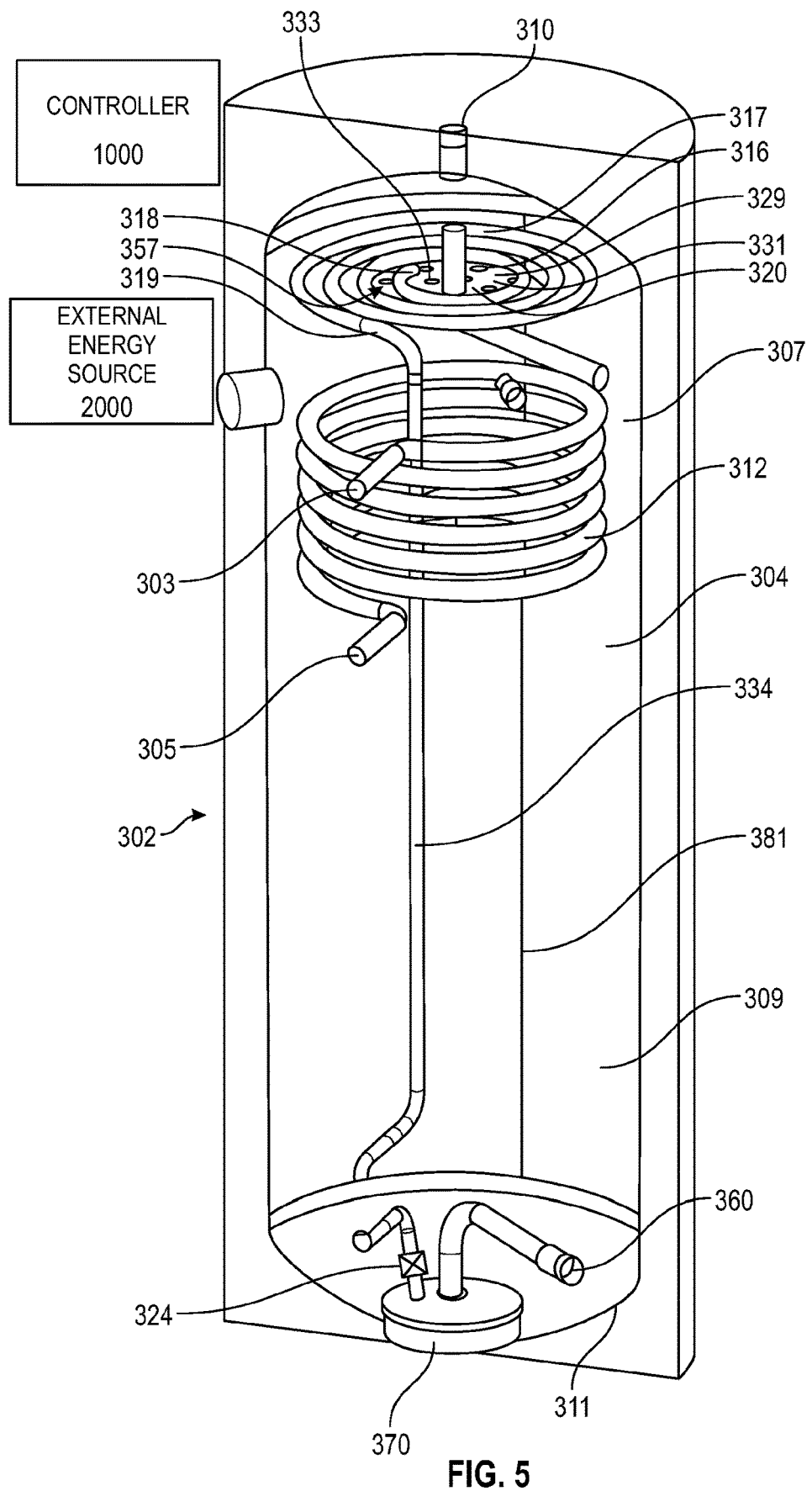
FIG. 5 is a front perspective cut-away sectional view of the hot water storage tank of FIG. 4.

In FIGS. 4 and 5, a further embodiment is shown comprising an identical hot water storage tank 302 to that of FIGS. 2 and 3, except that the heat transfer device is not provided in the form of a canister 215. Instead of pumping cold water to the canister 215, cold water is pumped to a heat transfer device 316 in the form of a helical coil heat exchanger 317 via the fluid-pipe connection 334. The helical coil 317 has an inlet 319 fed by the fluid connection pipe 334 and a discharge outlet 318.

In this alternative embodiment the heating element 380 is also provided in a side wall of the tank 302 below the diffuser 320 rather than in the top dome of the tank as in the embodiment of FIGS. 2 and 3, and the temperature and pressure sensor 381 is provided on an opposite side wall to the heating element 380 rather than in the top dome of the tank as in the embodiment of FIGS. 2 and 3.

A diffuser 320 may be provided below the helical coil 317. The diffuser 320 comprises a circular plate 329 with an upper surface 331 and a mixer portion 357 comprising a plurality of through apertures 333 which extend through the circular plate 329. The diffuser 320 is positioned relative to the helical coil 317 such that drawn water is discharged via the discharge outlet 318 onto the upper surface 331 of the circular plate 329.

The hot water storage tank of FIGS. 4 and 5 operates as follows:

Cold water is drawn from the base 311 of the tank via the fluid connection pipe 334 and into the helical coil 317. The water in the helical coil is heated by the hot water surrounding it in the upper portion 307 which has been heated by either the heating element 380, the primary heat exchanger 312, or a combination of both.

As in the embodiment of FIGS. 2 and 3, the pump speed is modulated such that when water is discharged from the discharge outlet 318, the water will have been sufficiently heated to prevent the hot water in the upper portion of the tank mixing with the colder water in the lower portion, and therefore a steady, thin thermocline is maintained. Further mixing of hotter with colder water is minimised by discharging the drawn water into the upper portion 307 of the tank via the mixer portion 357 comprising the upper surface 331 of the circular plate 329 and through apertures 333. Thus, mixing the drawn water with the hot water in the top portion 307 of the tank 302 further enabling transfer of heat from the heated water in the upper portion to the drawn water. The uniform temperature water can then gently discharge through the plurality of through apertures 333 into the upper portion 307, generating minimal mixing and maintaining a steady, thin thermocline.

Figure 6:
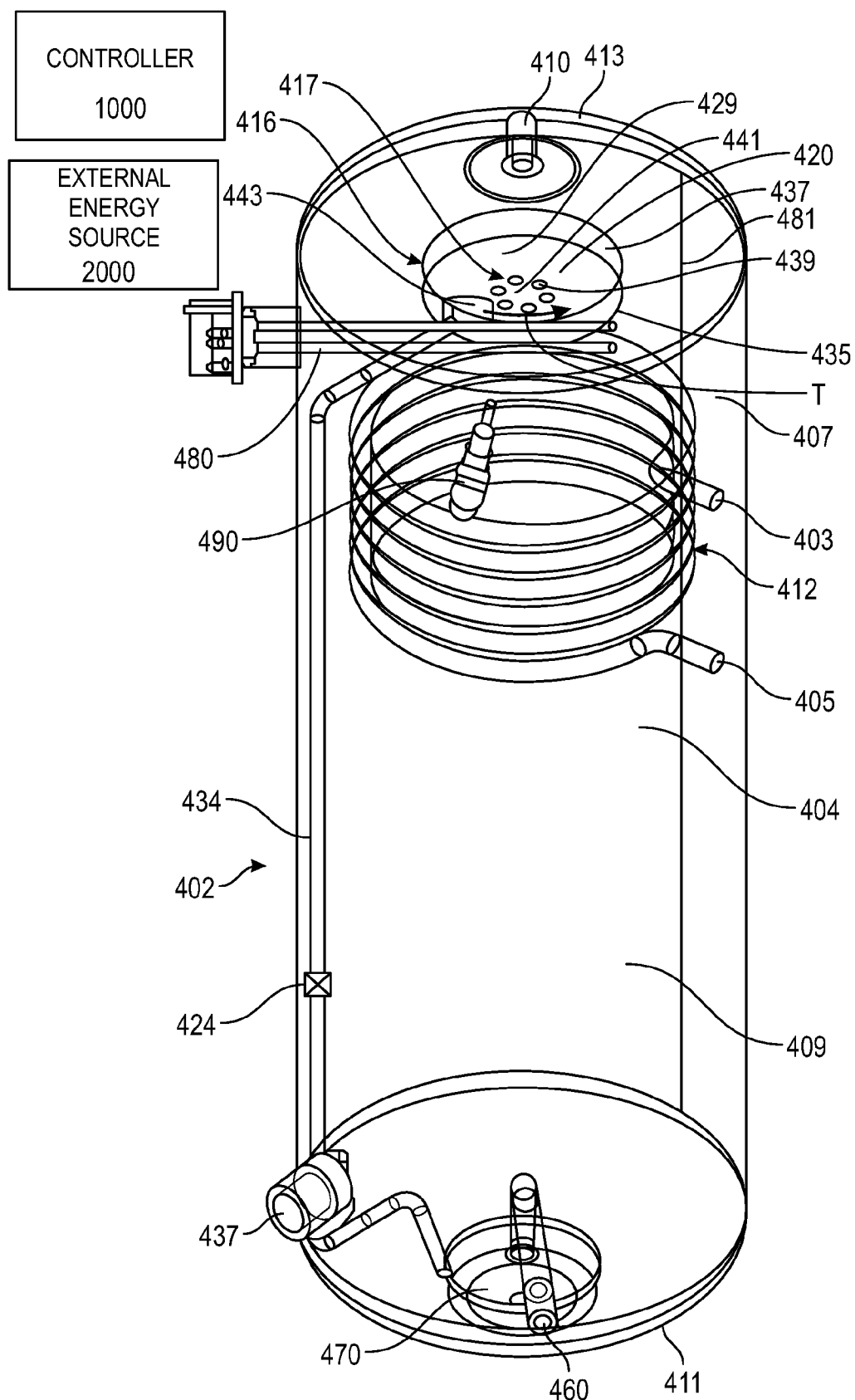
FIG. 6 is a front perspective view of a hot water storage tank according to another aspect of the present invention.
Figure 7:
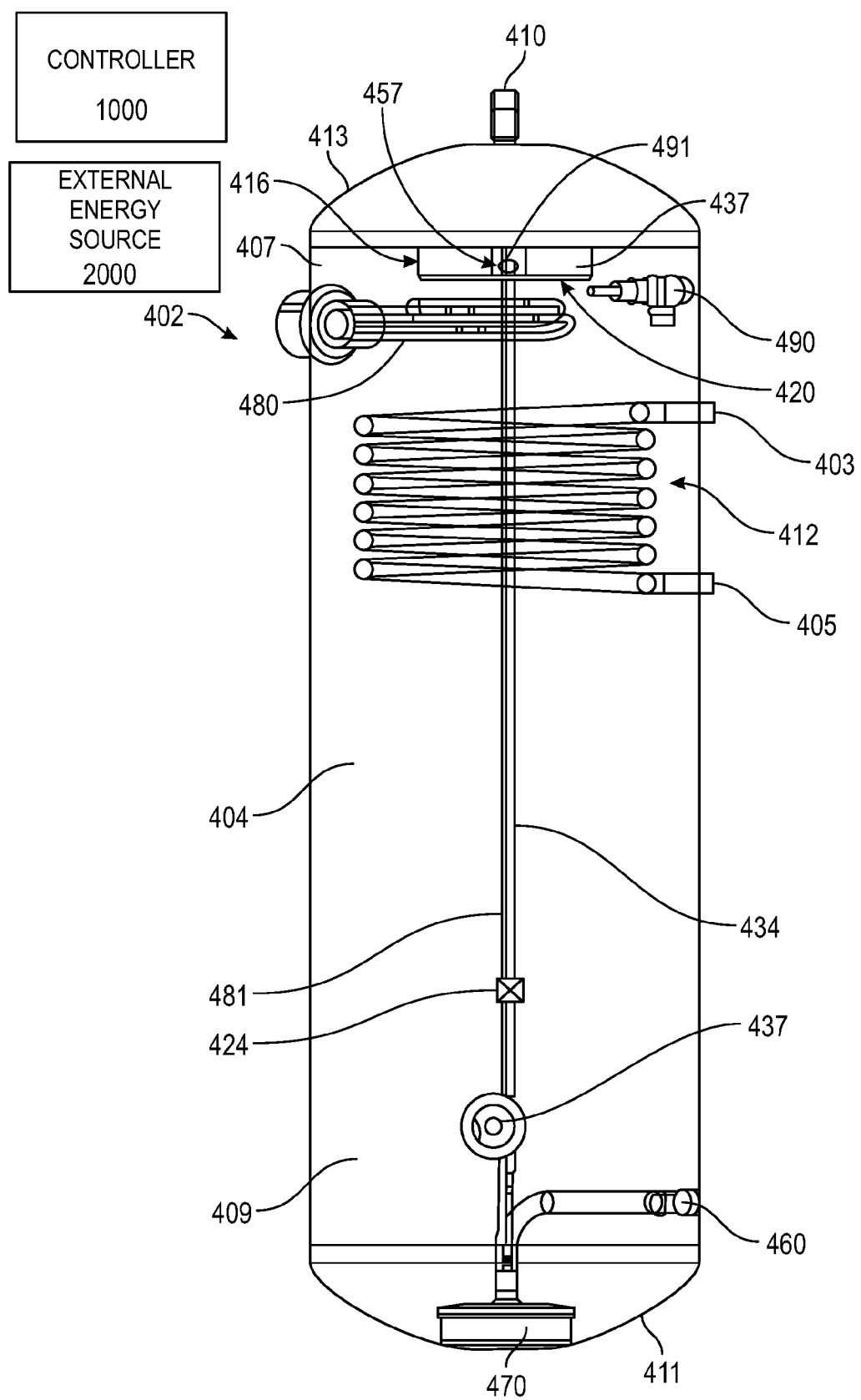
FIG. 7 is a front view of the hot water storage tank of FIG. 6.

In FIGS. 6 and 7, a further embodiment is shown comprising an identical hot water storage tank 402 to that of FIGS. 4 and 5, except drawn water is fed directly into a heat transfer device 416 in the form of a diffuser 420 rather than through the helical coil heat exchanger 317 and then onto the diffuser 320.

The diffuser 420 comprises a circular plate 429 having a perimeter 435. An upstanding wall 437 extends from the perimeter 435 to define a bowl-like structure. The circular plate 429 includes a plurality of apertures 439 which are arranged around a centre point 441 at a fixed radius remote from the perimeter 435. An aperture 491 is provided in the side wall 437 through which the drawn water enters the diffuser 417. The diffuser 417 further comprises a deflector 490 which extends radially inwardly from the upstanding wall 437 so as to deflect the drawn water such that it is directed towards the upstand wall and follows a tangential path T around the perimeter 435 of the diffuser 417.

The hot water storage tank of FIGS. 6 and 7 operates as follows:

Cold water is drawn from the base 411 of the tank via the fluid connection pipe 434 and into the diffuser 417. The water in the diffuser 417 is heated by the hot water surrounding it in the upper portion 407 which has been heated by either the heating element 480, the primary heat exchanger 412, or a combination of both.

As in the embodiment of FIGS. 4 and 5, the pump speed is modulated to control the flow into the diffuser 417. However, unlike the embodiment of FIGS. 4 and 5 where the pump speed is controlled to enable the drawn water to be heated up as it flows through the helical coil 317, the flow into the diffuser 417 is controlled to ensure that the drawn water remains in the diffuser and mixes with surrounding water in the upper portion 407 within the diffuser before the drawn water is discharged into the upper portion 407 via apertures 439.

Figure 8:
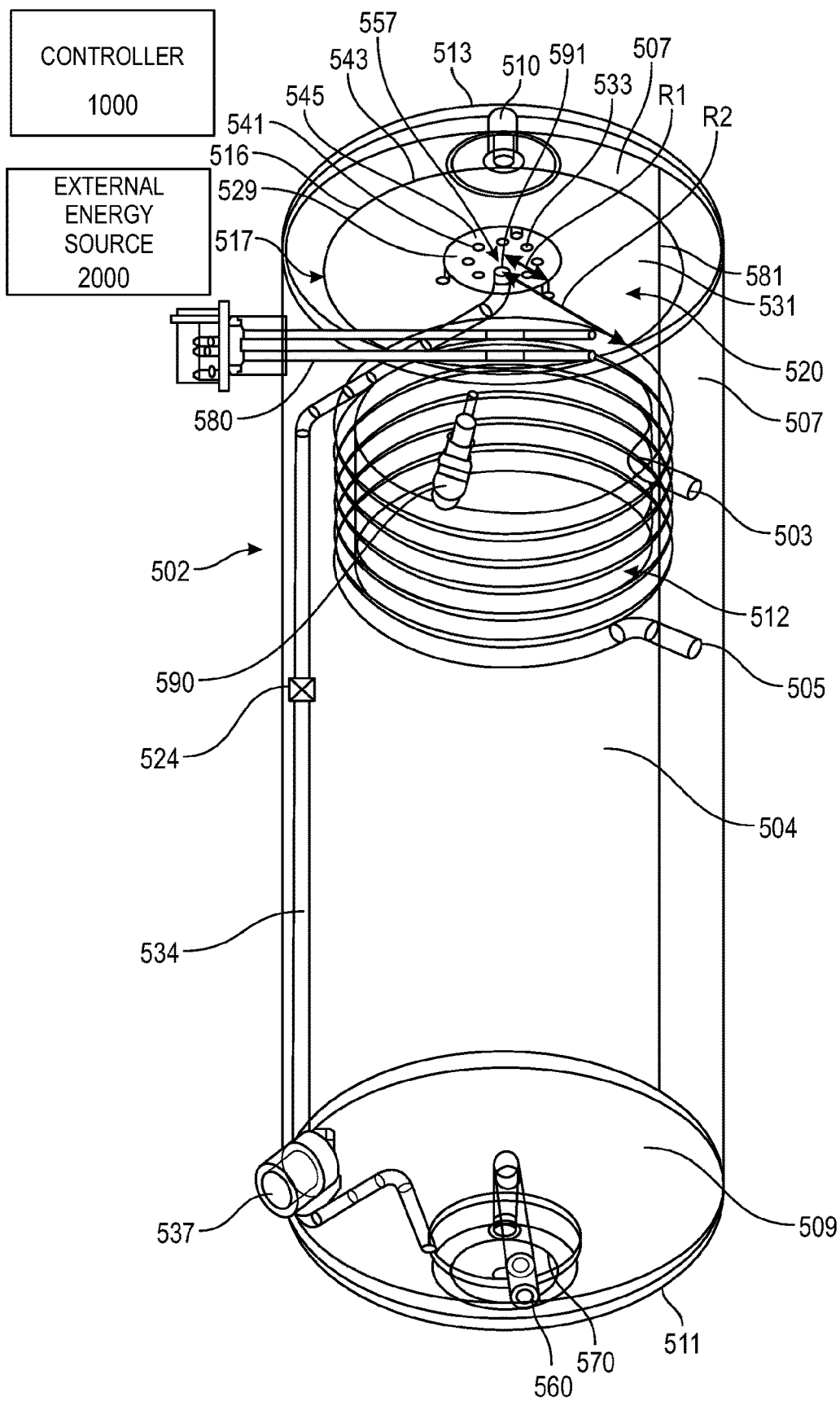
FIG. 8 is a front perspective view of a hot water storage tank according to another aspect of the present invention.

In FIG. 8, an alternative embodiment is shown comprising an identical hot water storage tank 502 to that of FIGS. 6 and 7, with an alternative diffuser 517.

The diffuser 517 comprises a first upper circular plate 529 and a second lower circular plate 543 which is vertically spaced from and has a larger diameter and therefore radius R2 than the radius R1 of the first circular plate 529. The upper circular plate 529 has a plurality of through apertures 533 located on an upper surface 541. The lower circular plate 543 has an inlet 591 through which drawn water is fed to the diffuser 517 and an upper surface 531. The first upper circular plate 529 is fixed to the second lower plate 543. In various advantageous embodiments the second lower plate 543 can be fixed to the upper or lower face of the first upper circular plate 529.

The hot water storage tank of FIG. 8 operates as follows:

Cold water is drawn from the base 511 of the tank via the fluid connection pipe 534 and into the diffuser 520 via inlet 591. The drawn water on the upper surface 531 is heated by hotter water from the upper portion 507 being pulled through the apertures 533 and the diffuser 520 is heated by the hot water surrounding it in the upper portion 407 which has been heated by either the heating element 580, the primary heat exchanger 512, or a combination of both. Therefore, the drawn water is mixed with the hot water at the top of the tank drawn through the apertures 533 in the first upper circular plate 529 and then heated by the lower circular plate 543 prior to being discharged from the second circular plate 543 and a steady thermocline is maintained.

As in the embodiment of FIGS. 6 and 7, the pump speed is modulated to control the flow into the diffuser 520 to ensure that the drawn water remains on the upper surface 531 of the lower plate 543 to enable it to mix with surrounding hotter water in the upper portion 507, and exchange heat with the hot water in the upper portion 507 by way of the second lower circular plate 543 before it is discharged into the upper portion 507 from the edge of the lower plate 543.

Figure 9:
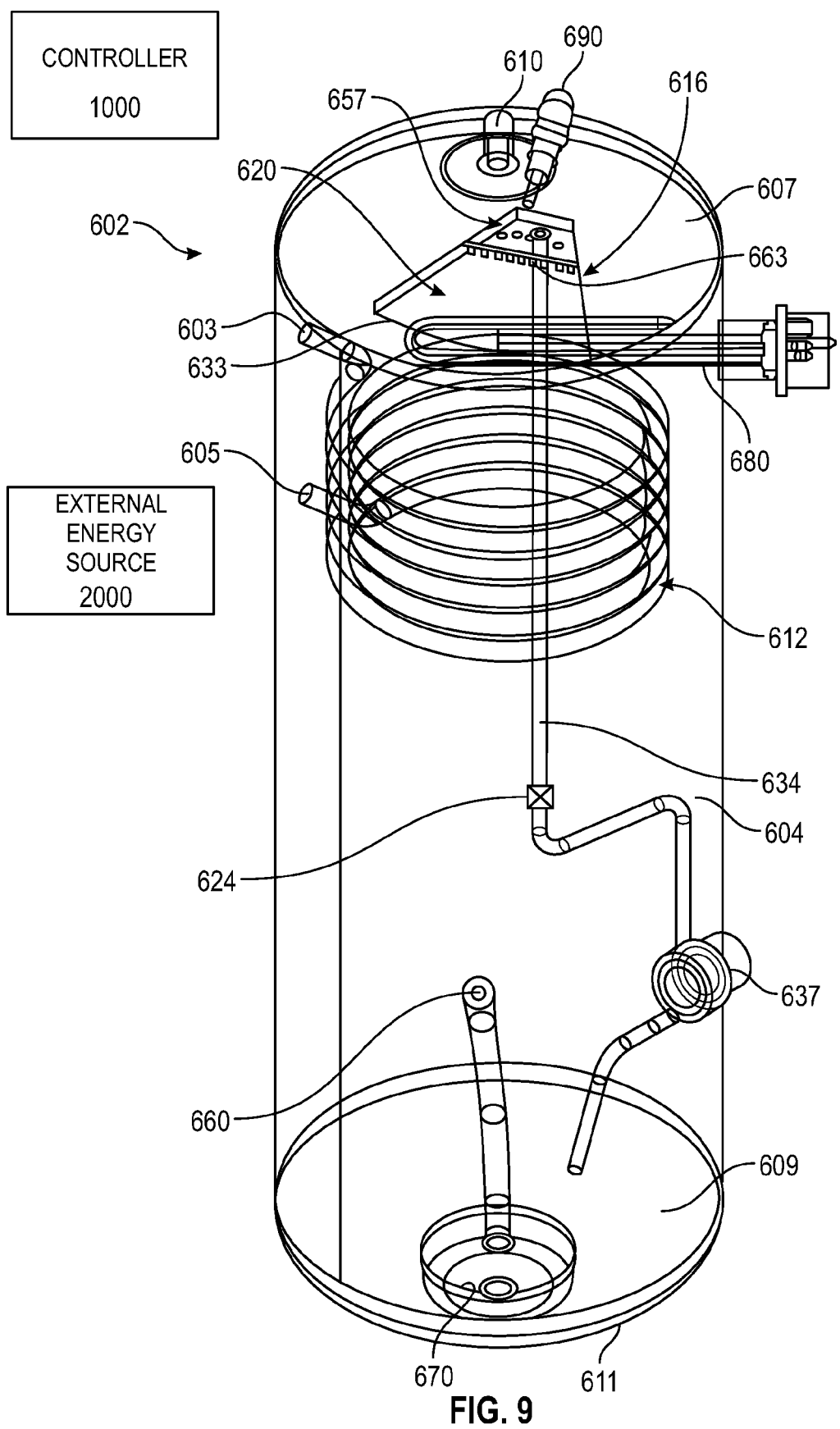
FIG. 9 is a front perspective view of a hot water storage tank according to another aspect of the present invention.
Figure 10:
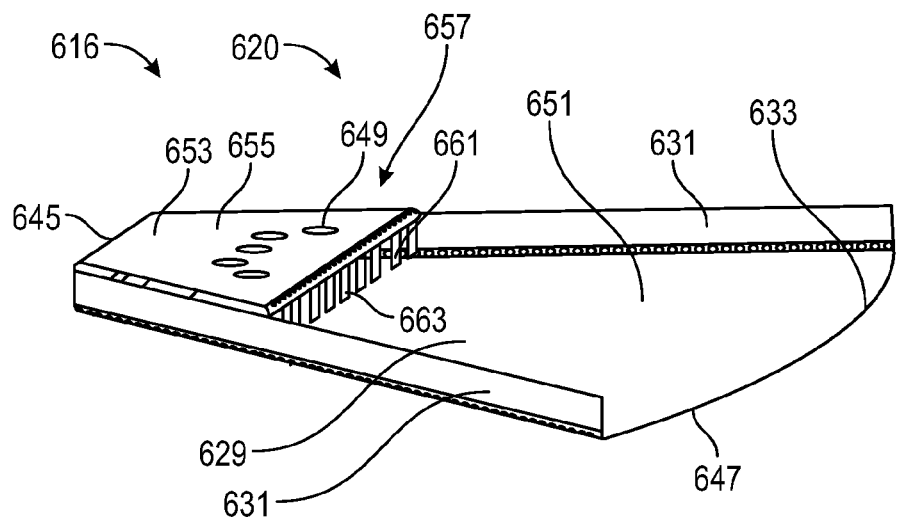
FIGS. 10 and 11 are enlarged perspective views of a diffuser of the hot water storage tank of FIG. 9.
Figure 11:
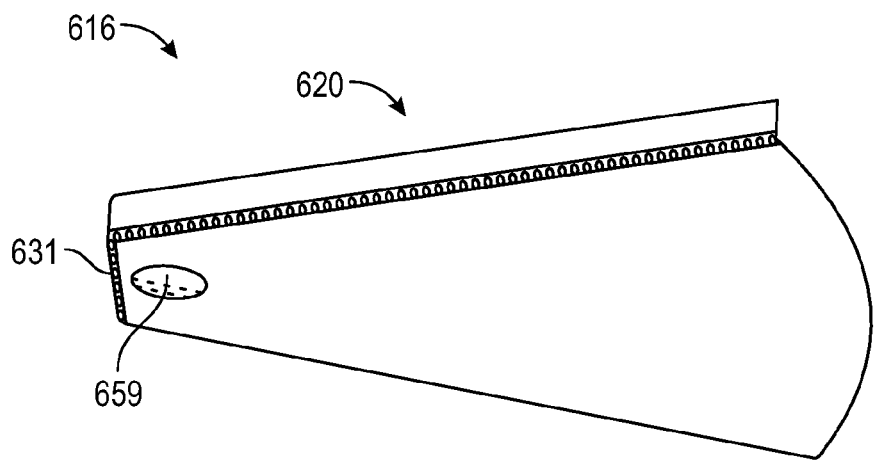

In FIGS. 9 to 11 an alternative embodiment is shown comprising, an identical hot water storage tank 602 to that of FIG. 8, with an alternative diffuser 620.

The diffuser 620 which forms a second aspect of the present invention comprises a lower plate 629 which defines a mixing zone 657 and a perimeter 647. An upstanding wall 631 extends partially around the perimeter to define an open end 633. The upstanding wall 631 preventing discharge of the drawn water until it reaches the open end 633.

The diffuser 620 comprises a partially enclosed drawn water inlet zone 649 adjacent an open discharge zone 651. The drawn water inlet zone 649 has a drawn water inlet aperture 659 which allows drawn cold water to enter the drawn water inlet zone 649 and a cover 653. The cover 653 includes a plurality of through apertures 655 which enable heated water from the upper portion 607 to enter the drawn water inlet zone 649 and mix with the cold drawn water in the mixing zone 657, before the drawn water is discharged into the discharge zone 651. A dividing wall 661 separates the drawn water inlet zone 649 from the discharge zone 651. The dividing wall 661 includes a plurality of apertures 663 enabling the flow of mixed water from the drawn water inlet zone into the discharge zone.

The diffuser is fabricated from a single metal sheet, for example stainless steel 316L or any other potable water compatible material.

It can be seen from FIGS. 10 and 11 that the diffuser tapers outwards from the drawn water inlet zone 649 towards the discharge zone 651.

The hot water storage tank of FIGS. 9 to 11 operates as follows:

Cold water is drawn from the base 611 of the tank via the fluid connection pipe 634 and into the drawn water inlet zone 649 of the diffuser 620 via inlet aperture 659. The drawn water in the drawn water inlet zone 649 is partially constrained by the upstanding walls 631, the cover 653 and the dividing wall 661. The apertures 663 are sized so as to retain the drawn water in the drawn water inlet zone 649 for a sufficient time to enable mixing with the surrounding hotter water before the drawn water enters the discharge zone 651. Further mixing of drawn water takes place in the discharge zone 651 before the drawn water enters the upper portion 607 from the open end 633. It will be appreciated the diffuser 620 controls the velocity of the flow of the drawn water from the inlet aperture 659, creating a horizontal introduction over a broad cross-section at low velocity. Therefore, the drawn water is introduced gently to the heated water at the top 613 or top portion 607 of the tank 602 at a very low velocity from the open end 633 of the discharge zone 651. This provides minimal disturbance to the hotter water in the top 613 or top portion 607 of the tank 602 minimising mixing and maintaining the desirable vertical thermal stratification with a thin thermocline in the tank.

Figure 12:
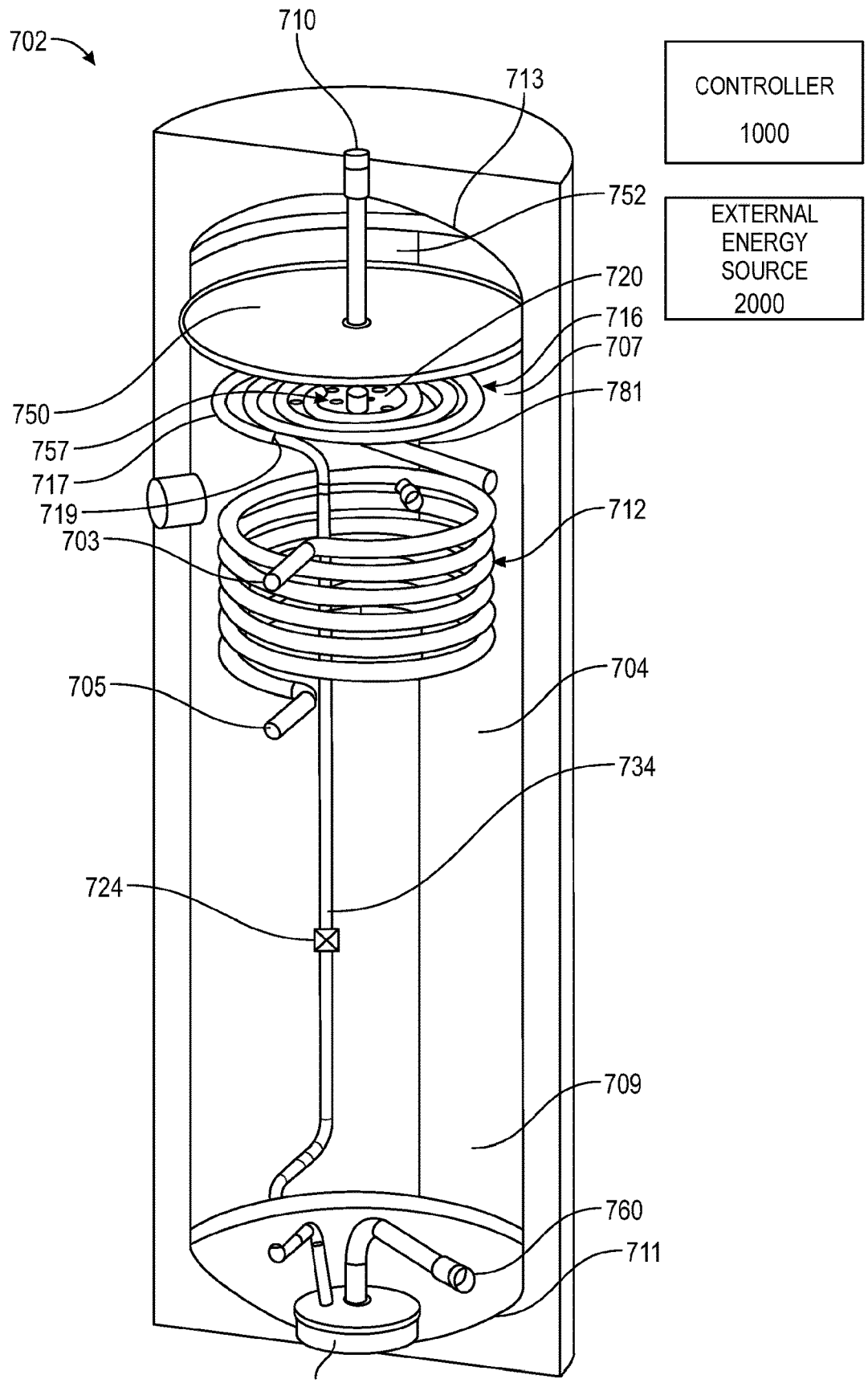
FIG. 12 is a front perspective view of a hot water storage tank according to another aspect of the present invention.
Figure 13:
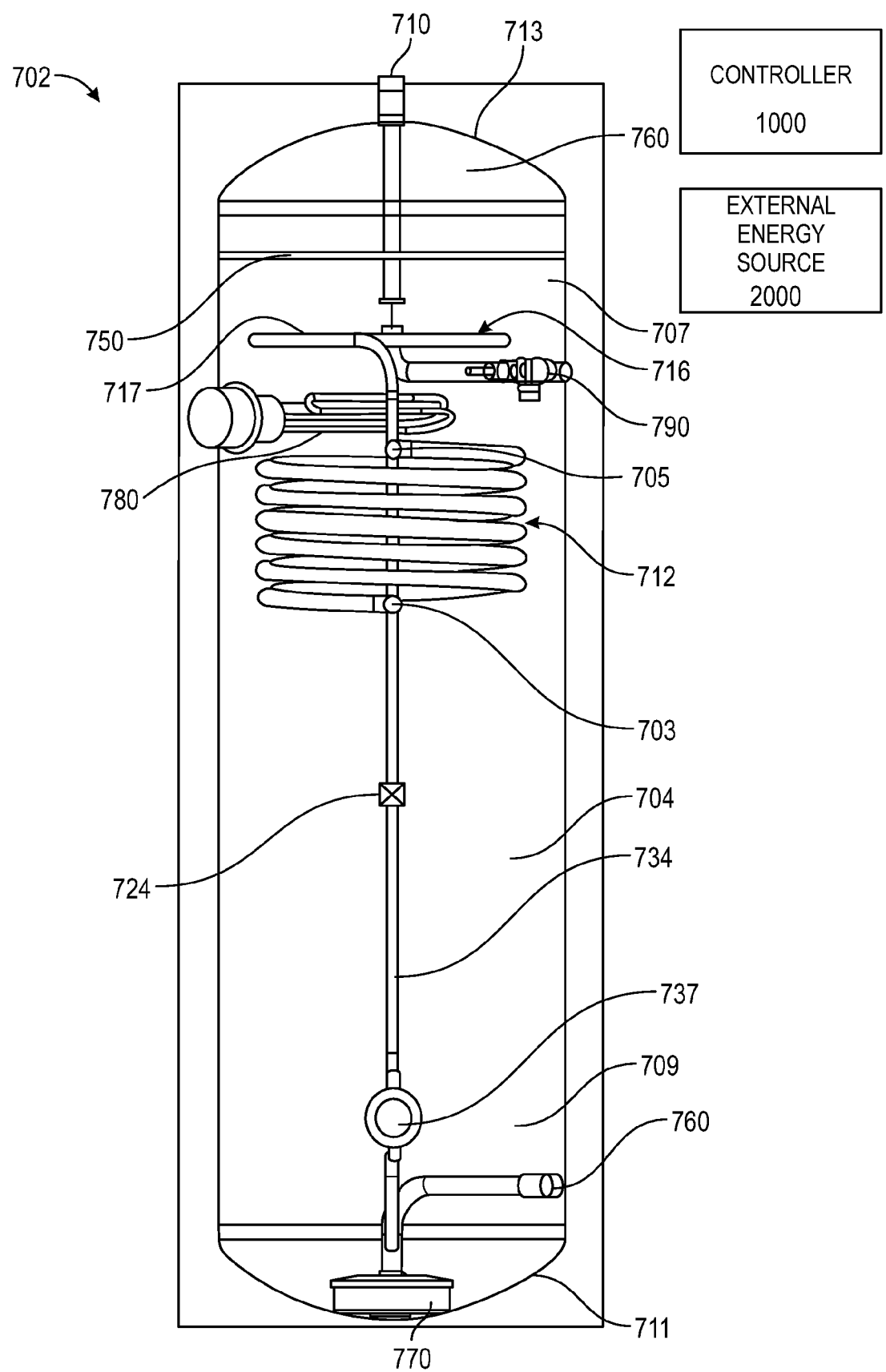
FIG. 13 is a front view of the hot water storage tank of FIG. 12.

In FIGS. 12 and 13, an identical hot water storage tank 702 to that of FIGS. 4 and 5 is shown, except the tank further comprises an expansion baffle 750 which defines an expansion air pocket 760 below the dome-shaped top 713.

Operation of the hot water storage tank 702 is identical to the tank of FIGS. 4 and 5.

It will be appreciated that one of the advantages of the hot water tank described in the embodiments of FIGS. 2 to 13 is the ability to switch between alternative energy sources to heat the water in the tank. Furthermore, it will be appreciated that the heat transfer device 216, 316, 416, 516, 616, 716 can comprise any combination of the heat exchangers 317, 415, 717 and diffusers 320, 420, 520, 620, 720 and it is advantageous to have both.

The second aspect of the present invention is shown in FIGS. 10 and 11 and includes a diffuser 620 which can be used in any hot water storage tank 202, 302, 402, 502, 602, 702 (or any other water storage tank) where it is desirable to introduce fluid of a different temperature without disturbing the stratification of the contents of said hot water tank 202, 302, 402, 502, 602, 702.

The diffuser 620 has lower plate 629, extending across the inlet zone 649 and discharge zone 651, which defines a mixing zone 657 and a perimeter 647. Upstanding side walls 631 extend partially around the perimeter to define an open end 633 in the discharge zone 651. The upstanding side walls 631 preventing discharge of the drawn water until it reaches the open end 633. The diffuser 620 comprises a partially enclosed drawn water inlet zone 649 adjacent an open discharge zone 651 and a mixing zone 657 spanning both inlet and discharge zones. The drawn water inlet zone 649 has a drawn water inlet aperture 659 extending through the lower plate 629, which allows drawn cold water to enter the drawn water inlet zone 649. The drawn water inlet zone 649 further comprises a cover 653 spaced from the lower plate 629, defining therebetween the drawn water inlet zone 649. The cover 653 includes a plurality of through apertures 655 which enable heated water from the upper portion 607 to enter the drawn water inlet zone 649 and mix with the cold drawn water in the mixing zone 657, before the drawn water is discharged into the discharge zone 651. A dividing wall 661 separates the drawn water inlet zone 649 from the discharge zone 651. The cover 653 extending over the entirety of said inlet zone 649 ending at the upstanding walls 631 and the dividing wall 661. The dividing wall 661 includes a plurality of apertures 663 enabling the flow of mixed water from the drawn water inlet zone into the discharge zone. The diffuser is fabricated from a single metal sheet, for example stainless steel 316L or any other potable water compatible material.

It can be seen from FIGS. 10 and 11 that the diffuser 620 tapers outwards from the drawn water inlet zone 649 towards the open end 633 in the discharge zone 651 such that the velocity of the flow of the drawn water is reduced. It will be understood that in various embodiments the angle of the taper can be constant, can increase or can decrease with distance from the water inlet zone 649.

The diffuser of FIGS. 10 and 11 operates as follows:

Cold, drawn water enters the drawn water inlet zone 649 of the diffuser 620 via inlet aperture 659. The drawn water in the drawn water inlet zone 649 is partially constrained by the upstanding walls 631, the cover 653 and the dividing wall 661. The apertures in the dividing wall 663 are sized so as to retain the drawn water in the drawn water inlet zone 649 for a sufficient time to enable mixing with the surrounding hotter water drawn through the apertures in the cover 655 before the drawn water enters the discharge zone 651. Further mixing of drawn water takes place in the discharge zone 651 and heating from the lower plate 629, before the drawn water enters the upper portion 607 from the open end 633. It will be appreciated the diffuser 620 controls the velocity of the flow of the drawn water from the inlet aperture 659, creating a horizontal introduction over a broad cross-section at low velocity. Therefore, the drawn water is introduced gently to the heated water at the top 613 or top portion 607 of the tank 602 at a very low velocity from the open end 633 of the discharge zone 651. This provides minimal disturbance to the hotter water in the top 613 or top portion 607 of the tank 602 minimising mixing and maintaining the desirable vertical thermal stratification with a thin thermocline in the tank.

In one embodiment the diffuser 620 is disposed in the domed top 613 of a hot water tank 602. In a further embodiment the diffuser 620 is disposed in the upper portion 607 of a hot water tank 602 but not in the domed portion.

In a third aspect of the present invention a method of selecting a cost-effective heating schedule for a hot water storage tank 202, 302, 402, 502, 602, 702 is provided. In a preferred embodiment the hot water storage tank 202, 302, 402, 502, 602, 702 is designed to promote stratification and maintain a thin thermocline.

In said preferred embodiment the tank 202, 302, 402, 502, 602, 702 may define a primary storage volume 204, 304, 404, 504, 604, 704 including an upper portion 207, 307, 407, 507, 607, 707 and a lower portion 209, 309, 409, 409, 509, 609, 709 in which water is heated by at least one heat source 212, 312, 412, 512, 612, 712 positioned in the upper portion 207, 307, 407, 507, 607, 707 of the tank 202, 302, 402, 502, 602, 702. The tank comprises means 237, 337, 437, 537, 637, 737 operable to draw water from the lower portion 209, 309, 409, 409, 509, 609, 709 of the tank 202, 302, 402, 502, 602, 702 into a heat transfer device 216, 316, 416, 516, 616, 716 situated in the upper portion 207, 307, 407, 507, 607, 707 or top 213, 313, 413, 513, 613, 713 of the tank 202, 302, 402, 502, 602, 702. Said heat transfer device 216, 316, 416, 516, 616, 716 transfers heat from hot water in the upper portion 207, 307, 407, 507, 607, 707 of the tank 202, 302, 402, 502, 602, 702. The tank 202, 302, 402, 502, 602, 702 further comprises a water outlet in the top 213, 313, 413, 513, 613, 713 of the tank 202, 302, 402, 502, 602, 702 for supplying hot water.

Figure 14:
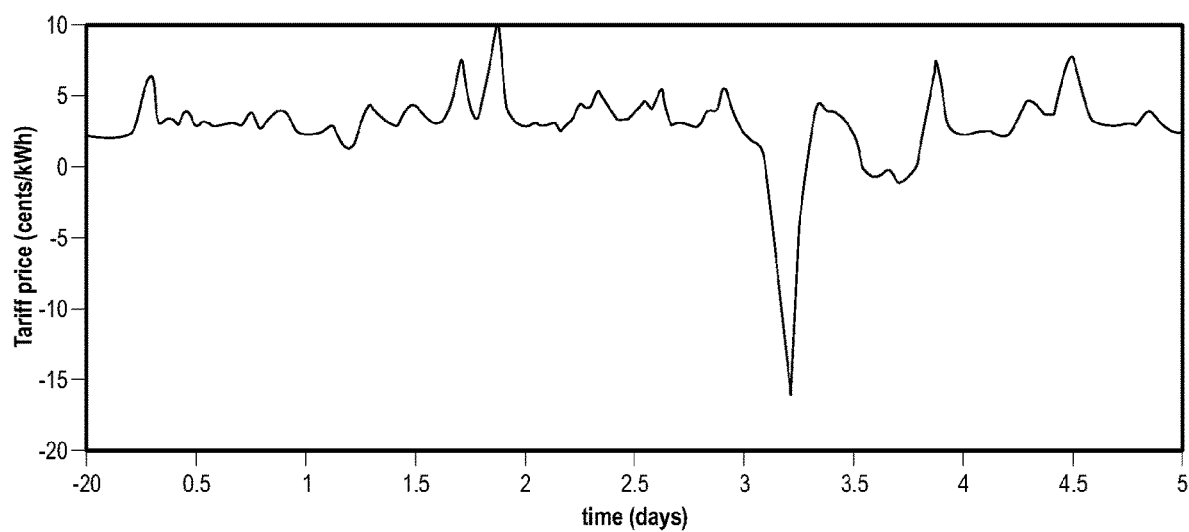
FIG. 14 is flexible energy price tariff graphs to illustrate the method of selecting a heating schedule according to another aspect of the present invention.

FIG. 14 shows a reference energy price forecast for a given tariff which identifies the price to purchase energy over a future period of time for the given energy type, in this case, electricity, and for the given tariff, in this case a flexible tariff. The reference energy price forecast can be polled from the server of a utility company, a power system operator, for example, National Grid, an aggregator working on behalf of one or more utility companies or power system operators. The reference energy price forecast can also be predicted based on historically gathered price data. Additional reference energy price forecasts can be obtained for different tariffs within the given energy type, for different energy types, and for different utility companies, power system operators, and aggregators.

Figure 15:
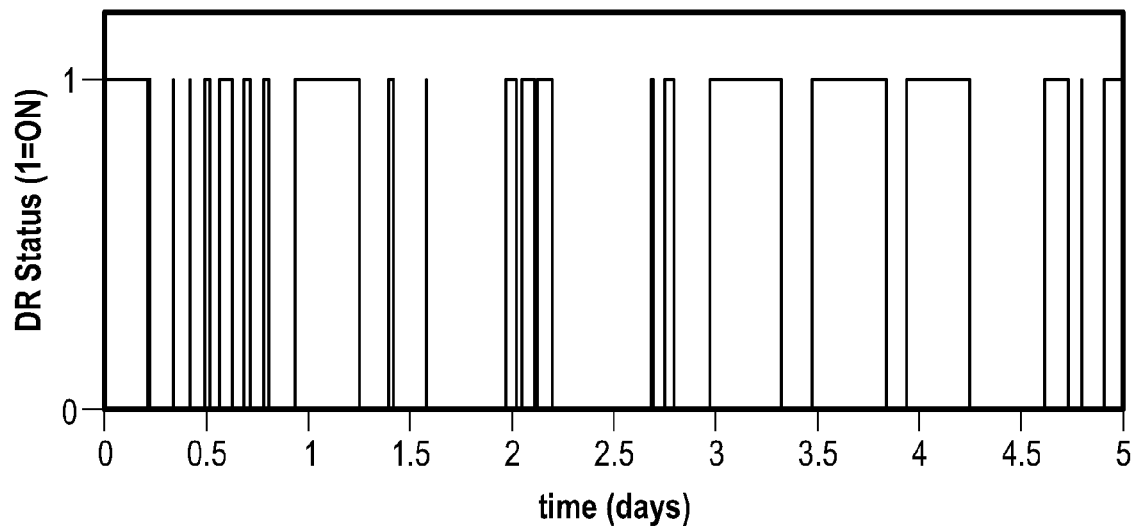
FIG. 15 is a graph indicating a draw status over time.
Figure 16:
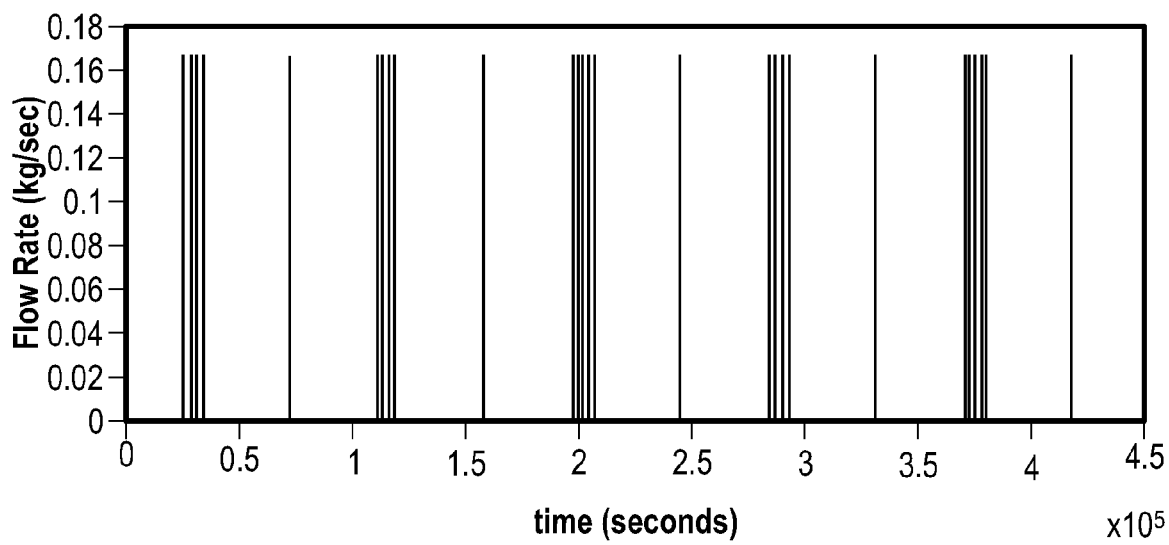
FIG. 16 is a graph indicated a flow rate over time.

The hot water storage tanks of FIGS. 2 to 13 include a state of charge sensor which enables the energy used in water draw cycles over a historical period of time to be determined based on the period of time at which water was being drawn from the tank (FIG. 15) to give temperature, and the volume of water, or flow rate, being withdrawn from the tank (FIG. 16). In various embodiments said state of charge sensor can be a single temperature sensor, a plurality of temperature sensors, a flow sensor, a thermocline sensor. In a further possible embodiment, the state of charge of the hot water tank can be inferred via monitoring of the reheat energy should a conventional hot water tank be used.

A heating schedule can then be selected based on the following method:

Firstly, one or more historical draw cycles comprising temperature and/or volume requirements with respect to time are used to predict one or more future draw cycles and determine the predicted amount of energy required over a future time period for each of said future drawer cycles. In a preferred embodiment this data is collected using the aforementioned sensors in the tank for which the schedule is being used. In an alternative embodiment the data can be from before the tank is installed or from an alternative location if for instance the circumstance is alike.

For that future time period, at least one reference energy price forecast is provided for a given energy type, provider, and tariff over the same future period of time.

In a first embodiment the forecast energy required and energy price forecast over a future time period are the same as the historical data. In a further embodiment forecast tools using techniques such as piecewise linear or logistic regression can be used where seasonal components are deduced using Fourier analysis. Online tools are available to carry out this function such as 'Facebook Prophet'. In another further embodiment the future usage can be further optimised where possible using user input data. Events such as holidays, use of the washing machine or known pricing events can be input manually by the user.

The next stage is to determine the energy required for each future draw cycle to provide the required volume of water and the minimum acceptable temperature for this water. Thereby determining for each of the one or more future draw cycles a vertical temperature profile for the hot water storage tank required to provide said required volume of water at said minimum outlet temperature for the one or more future draw cycles.

In a preferred embodiment, simulated heating schedules are run based on the above price forecast and the energy required to determine the heating schedule which corresponds to the minimum energy purchase cost for that period of time required to provide the volume of water at least at the determined minimum outlet temperature at the time required. It should be understood that selecting a lowest energy price within a future price forecast will not necessarily result in the lowest cost.

In a preferred embodiment for each heating schedule, a simulated vertical temperature profile, that is to say, the temperature at different vertical positions in the hot water storage tank, is determined using a one-dimensional numerical based time-series model, to meet the minimum water temperature for each of said predicted future draw cycles. Such models are well understood and described in Klein, S. A., & Beckman, W. A. (2007). TRNSYS 16: A Transient System Simulation program: Mathematical Reference-Volume 5. *TRNSYS*, 5, 389 to 396, Kleinbach, E. M., Beckman, W. A., & Klein, S. A. (1993). Performance study of one-dimensional models for stratified thermal storage tanks. *Solar Energy*, 50(2), 155-166, and Zurigat, Y. H., Maloney, K., & Ghajar, A. (1989). A Comparison Study of One-Dimensional Models for Stratified Thermal Storage Tanks. *Transactions of the ASME*, 111, 204 to 210.

In a further embodiment a physical model is used to determine the simulated vertical temperature profile using mixed integer linear programs making use of technologies such as the SIMPLEX algorithm which derives the optimal heating profile using a linearised physical model of the system. In another further embodiment the simulated vertical temperature profile is determined using an observational model to teach deep neural networks (such as Generative Adverserial Networks) to synthesise a model of the system without any physical knowledge or parameterisation.

For each heating schedule of the preferred embodiment, the total energy cost is then calculated based on the selected reference energy price forecast.

The next stage is to determine which of the simulated heating schedules would ensure enough useful hot water was available over the future time period. This is determined by checking that the heating schedule with the minimum total energy purchase cost results in a simulated outlet temperature that is equal to a minimum required outlet temperature, for example, 43° C. including any margins, or a state of charge is greater than a pre-determined level, for example, 50%.

Both the simulated outlet temperature and the state of charge are derived from the from the simulated vertical temperature profile.

The state of charge is defined as the percentage of the usable volume of water Vu to the maximum volume of water in the tank, Vmax, where:

$$V_u = \int_{x@T(x)>T_u}^{H} A(x)\left[1 + \frac{T(x) - T_u}{T_u - T_c}\right]dx$$

x is the vertical position in the tank, H is the height of the tank, A is the cross-sectional area of the tank at each vertical position, Tu is the outlet temperature, and Tc is the inlet temperature.

The heating schedule with the minimum total energy cost, and in which the simulated outlet temperature or the state of charge meet the required criteria is then selected.

A specific methodology for determining and selecting a heating schedule is given below:

Firstly, a reference energy price forecast for a future period of time is chosen according to a given energy type, provider, and tariff.

A maximum energy purchase price is chosen, i.e. a purchase price above which energy will not be purchased.

Based on the maximum energy price, the simulated vertical temperature profile is determined by simulating the historical draw cycle at the chosen maximum energy purchase price over the reference energy price forecast.

The maximum energy purchase price is then iteratively adjusted until a heating schedule is determined which corresponds to the maximum energy purchase price at which the simulated outlet temperature derived from the simulated vertical temperature profile is equal to the minimum required outlet temperature, or a state of charge derived from the simulated vertical temperature profile is greater than a pre-determined level.

Figure 17:
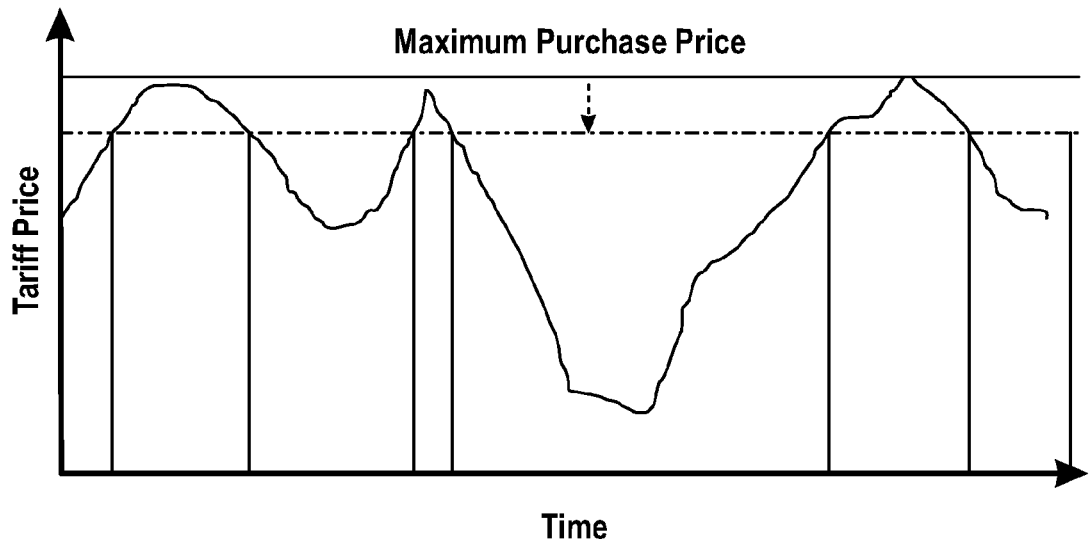
FIGS. 17 to 20 are flexible energy price tariff graphs to illustrate the method of selecting a heating schedule according to another aspect of the present invention.

The quantity of energy which can be purchased based on a chosen maximum energy price with respect to a flexible tariff is illustrated in FIG. 17 where it can be seen that lowering the maximum energy purchase price results in a lower amount of energy being purchased, potentially below a minimum amount of energy required to meet the historical draw cycle.

Figure 18:
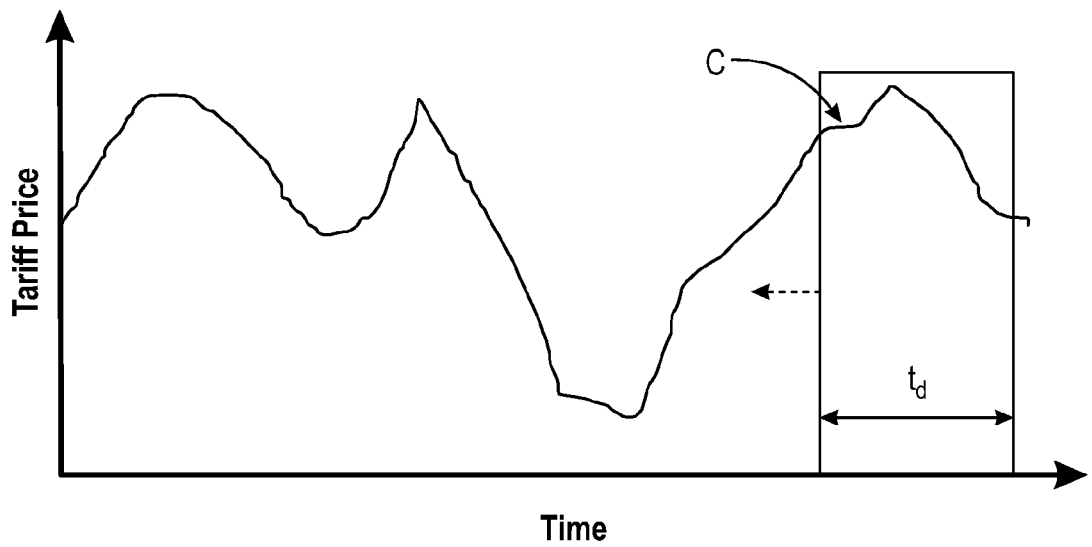

Another methodology for selecting a heating schedule is as follows:

Firstly, an energy content associated with the historical draw cycle is selected which ensures the simulated outlet temperature derived from the simulated vertical temperature profile is equal to a minimum required outlet temperature, or a state of charge derived from the simulated vertical temperature profile is greater than a pre-determined level. The energy content is then converted to a heating time duration (td) for a constant power level. Based on that heating time duration, a time phase of the reference energy price forecast can be selected which corresponds to the minimum total energy purchase cost. FIG. 18 illustrates this method where it can be seen that the total energy requirement, represented by block C, will result in a different total energy cost depending on which time phase is selected.

The above methodology is based on determining and selecting a heating schedule for a given flexible price tariff and energy type.

It is also possible to run the above simulated temperature profiles based on different energy price tariffs within the same provider, different providers, and different energy types, and for both flexible price tariffs and fixed price tariffs to determine which energy type should be used, and which energy tariff should be used based on the heating schedule which results in the lowest energy purchase cost for a historical draw cycle.

By way of example, a heating schedule can be selected by determining a simulated vertical temperature profile for each of a plurality of different reference energy price forecasts, and selecting a heating schedule which corresponds to the minimum total energy purchase cost and in which a simulated outlet temperature derived from the simulated vertical temperature profile is equal to a minimum required outlet temperature, or a state of charge derived from the simulated vertical temperature profile is greater than a pre-determined level.

A particular benefit of the hot water storage tank of the present invention is the ability to switch between different energy sources at different times, and therefore by simulating the temperature profiles for different energy types, a heating schedule can be determined which instructs the hot water storage tank to use a first energy type associated with a first energy price forecast profile or a second energy type associated with a second energy price forecast profile or any number of further energy types each associated with a corresponding price forecast profile which would result in the lowest energy purchase cost. The first energy type and the second energy type can be selected from any one of a gas or oil-fired boiler, a bio-mass boiler, a heat pump, solar mass, or any other external energy source 2000.

Figure 19:
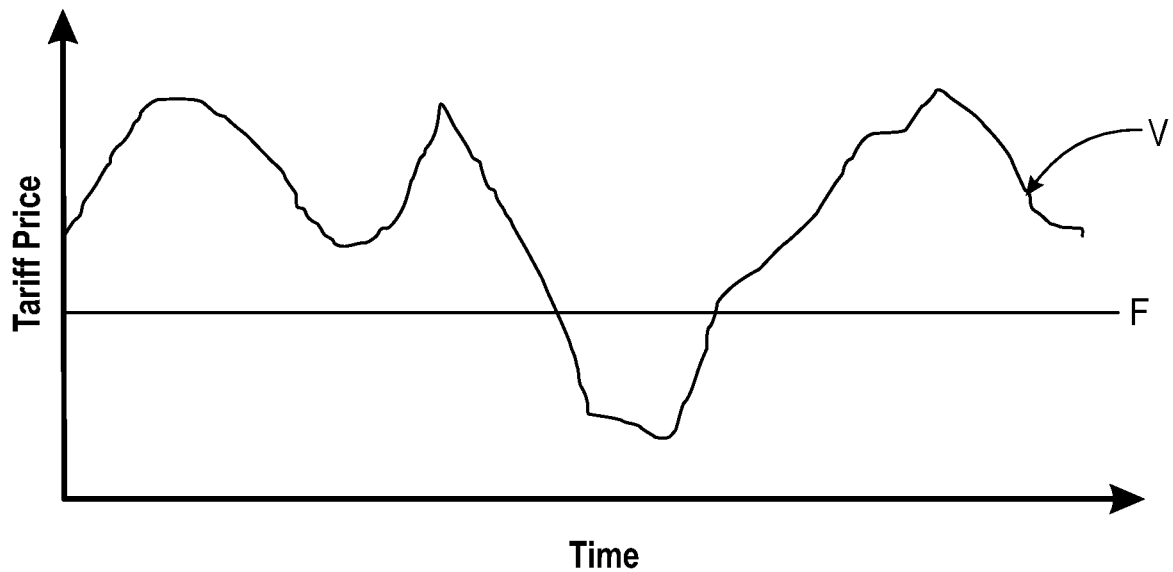
Figure 20:
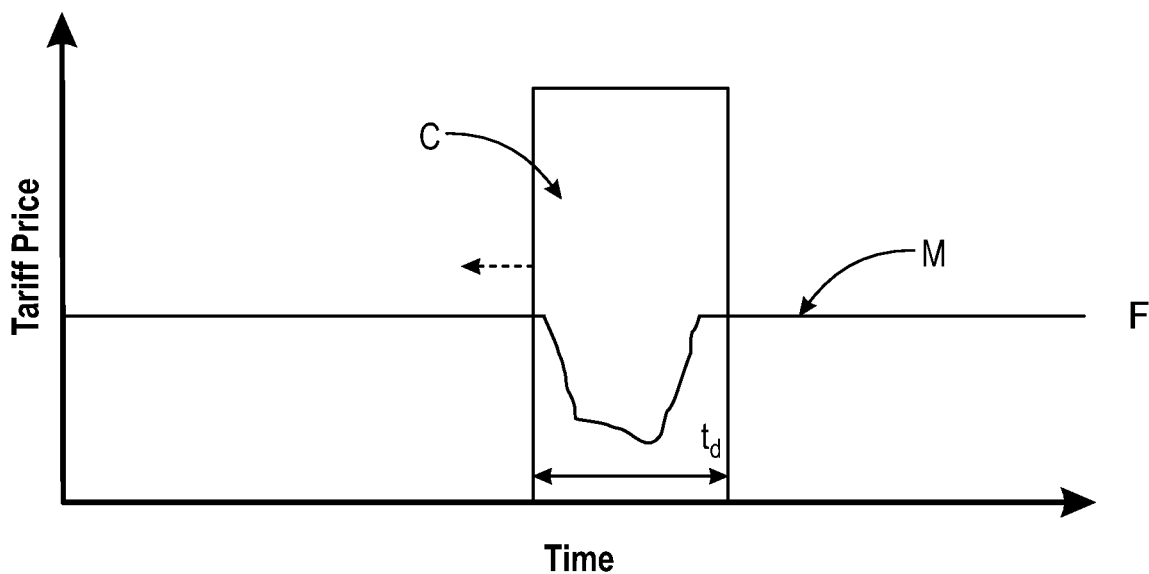

FIGS. 19 and 20 illustrate another method of selecting a heating schedule based on comparing a fixed energy tariff and a flexible energy tariff as follows.

A first energy price forecast V is selected which is variable over the future period of time and a second energy price forecast F is selected which is fixed over the future period of time.

A modified energy price forecast M is then determined by disregarding the first energy price forecast V for periods of time when a first energy price associated with the first energy price forecast V is greater than a second energy price associated with the second energy price forecast F.

The heating time duration (t_d) may be determined based on the historical draw cycle or may be based on pre-programmed user inputted expected demands. Alternatively, the system may analyse historical use and receive user inputs A time phase of the reference energy price forecast is then selected which corresponds to the minimum total energy purchase cost. FIG. 20 illustrates this method where it can be seen that the total energy requirement, represented by block C, will result in a different total energy cost depending on which time phase is selected.

It is also possible to divide the heating time duration into discrete blocks to determine which time phases should be selected to obtain the minimum total energy purchase cost.

the proportion of the duration of the heating time in each of the discrete time periods is based on the historical draw cycle and a maximum energy purchase price.

It will be understood that whilst the method of selecting a heat schedule complements the hot water storage tank of the present invention, the method can also be used with any hot water storage tank, irrespective of whether the tank can use more than one energy type over a forecast time period.

It will also be appreciated that the components described herein may be used in combination with reach other or individually and if used individually may be used on other forms of water storage tanks including hot and cold-water storage tanks.

The invention claimed is:

1. A hot water storage tank, defining a primary storage volume, at least one heat source positioned in and operable to directly heat water in an upper portion of the primary storage volume, a hot water outlet positioned in the upper portion, and a pump operable to draw water, from a lower portion of the tank into a heat transfer device, situated in said upper portion, in which the heat transfer device does not enclose the heat source or a further heat source and is configured to enable the transfer of heat from heated water in the upper portion to the drawn water;
   a feed pipe fluidly connected between the heat transfer device and the lower portion of the hot water storage tank to enable water to be pumped from the lower portion to the heat transfer device, the feed pipe being positioned inside and extending into the lower portion of the tank.

2. A hot water storage tank, according to claim 1 and further including a temperature sensor for sensing the temperature of water within the upper portion and a controller connected to the temperature sensor and the pump and operable to cause the pump to operate only to pump water into the heat transfer device when water in the upper portion is above a pre-determined threshold temperature.

3. A hot water storage tank, according to claim 1 in which the heat transfer device includes a heat exchanger configured to enable the transfer of heat from heated water in the upper portion to the drawn water in which the heat exchanger is a coiled heat exchanger.

4. A hot water storage tank defining a primary storage volume, at least one heat source positioned in and operable to directly heat water in an upper portion of the primary storage volume, a hot water outlet positioned in the upper portion, and a pump operable to draw water, from a lower portion of the tank into a heat transfer device, situated in said upper portion, in which the heat transfer device does not enclose the heat source or a further heat source and is configured to enable the transfer of heat from heated water in the upper portion to the drawn water;
   a feed pipe fluidly connected between the heat transfer device and the lower portion of the hot water storage tank to enable water to be pumped from the lower portion to the heat transfer device, the feed pipe being positioned inside and extending into the lower portion of the tank in which the heat transfer device includes a diffuser including a mixer portion for causing mixing of drawn water with heated water in the upper portion to enable the transfer of heat from heated water in the upper portion to the drawn water.

5. The hot water storage tank of claim 4 in which the diffuser comprises:
   a partially enclosed drawn water inlet zone adjacent an open discharge zone, the drawn water inlet zone having a drawn water inlet aperture to allow drawn cold water to enter the drawn water inlet zone, a lower plate,
   a cover spaced therefrom such as to define therebetween said water inlet zone, and a plurality of through apertures enabling heated water from the upper portion to enter the drawn water inlet zone and mix with the cold drawn water before the drawn water is discharged into the discharge zone.

6. The hot water storage tank of claim 5 in which the diffuser includes a dividing wall separating the drawn water inlet zone from the discharge zone, the dividing wall including a plurality of apertures enabling the flow of mixed water from the drawn water inlet zone into the discharge zone.

7. The hot water storage tank of claim 5 in which the diffuser, includes an open end of the discharge zone and tapers outwards from the drawn water inlet zone towards the open end of the discharge zone.

8. The hot water storage tank of claim 5, said lower plate extends into said discharge zone.

9. The hot water storage tank of claim 8, wherein said cover extends over the entirety of said inlet zone (649) and terminates at said dividing wall.

10. The hot water storage tank of claim 9, wherein the diffuser includes side walls extending upwardly from said lower plate thereby to define between them a mixing zone.

11. The hot water storage tank of claim 5, wherein said inlet aperture extends through said lower plate.

12. The hot water storage tank of claim 5, wherein said through apertures extend through said cover.

13. The hot water storage tank of claim 12 wherein said apertures are sized so as to retain the water in the inlet zone for a sufficient time to enable mixing with the surrounding water drawn through the through apertures.

14. The hot water storage tank of claim 4 in which the at least one heat source comprises a coiled heat exchanger having a water inlet operable to receive hot water from an external heat source, and a water outlet operable to return water to the external heat source.

15. The hot water storage tank of claim 14 in which the water inlet is positioned, in use, above the water outlet.

16. The hot water storage tank of claim 4 in which the at least one heat source includes an electrical heating element.

17. The hot water storage tank of claim 4 in which the at least one heat source includes an electrical heating element and that heating element is positioned below the diffuser.

18. The hot water storage tank of claim 4 in which the at least one heat source is one or more of a gas-fired boiler, a heat pump, biomass, or solar thermal.

19. The hot water storage tank of claim 4 in which the hot water storage tank includes an expansion baffle.

20. The hot water storage tank of claim 4 wherein said diffuser comprises a single sheet of metal.

\* \* \* \* \*